(12) United States Patent
Furukawa et al.

(10) Patent No.: US 7,337,244 B2
(45) Date of Patent: Feb. 26, 2008

(54) DATA TRANSFER APPARATUS, STORAGE DEVICE CONTROL APPARATUS AND CONTROL METHOD USING STORAGE DEVICE CONTROL APPARATUS

(75) Inventors: Masayuki Furukawa, Odawara (JP); Takahiko Takeda, Minamiasigara (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 10/883,895

(22) Filed: Jul. 2, 2004

(65) Prior Publication Data

US 2005/0120151 A1   Jun. 2, 2005

(30) Foreign Application Priority Data

Nov. 28, 2003   (JP)   ............................. 2003-400512

(51) Int. Cl.
    *G06F 13/00*   (2006.01)
(52) U.S. Cl. .................. 710/33; 710/240; 710/244
(58) Field of Classification Search ..................... None
    See application file for complete search history.

(56) References Cited

U.S. PATENT DOCUMENTS

| | | | |
|---|---|---|---|
| 5,727,183 | A | 3/1998 | Takahashi |
| 5,761,532 | A * | 6/1998 | Yarch et al. ................. 710/22 |
| 5,790,794 | A * | 8/1998 | DuLac et al. ............... 725/115 |
| 5,842,038 | A | 11/1998 | Williams et al. |
| 5,943,509 | A * | 8/1999 | Hori ............................. 710/54 |
| 6,108,743 | A * | 8/2000 | Debs et al. ................. 710/240 |
| 6,216,199 | B1 | 4/2001 | DeKoning et al. |
| 6,587,927 | B2 | 7/2003 | Hotta et al. |
| 6,988,151 | B2 * | 1/2006 | Tsuruta ........................ 710/36 |
| 2002/0091826 | A1 | 7/2002 | Comeau et al. |
| 2002/0099881 | A1 | 7/2002 | Gugel |
| 2003/0065836 | A1 | 4/2003 | Pecone |
| 2003/0110325 | A1 | 6/2003 | Roach et al. |
| 2003/0140196 | A1 | 7/2003 | Wolrich |
| 2004/0034743 | A1 | 2/2004 | Wolrich et al. |
| 2004/0073948 | A1 * | 4/2004 | Ishibashi ..................... 725/134 |
| 2004/0078528 | A1 * | 4/2004 | Chauvel et al. ............. 711/141 |
| 2004/0117580 | A1 | 6/2004 | Wu et al. |
| 2004/0143829 | A1 * | 7/2004 | Uchiumi et al. ............ 717/168 |
| 2004/0199718 | A1 | 10/2004 | Byers et al. |

FOREIGN PATENT DOCUMENTS

| | | |
|---|---|---|
| JP | 02-241191 A | 9/1990 |
| JP | 2003-091497 | 3/2003 |

\* cited by examiner

*Primary Examiner*—Kim Huynh
*Assistant Examiner*—Aurangzeb Hassan
(74) *Attorney, Agent, or Firm*—Townsend and Townsend and Crew LLP

(57) ABSTRACT

A data transfer apparatus includes a memory having first and second queues for storing data transfer information that includes information specifying a first memory area and information specifying a second memory area, a first processor which registers the data transfer information in the first or second queue, and a second processor performing a processing to transfer data stored in the first memory area to the second memory area. The second processor reads out the data transfer information registered in the first queue, transfers the data based on the read data transfer information, and decides if data transfer information succeeding to the read data transfer information is registered in the first queue. If the succeeding data transfer information is registered, the second processor reads out the succeeding data transfer information from the first queue, and performs the data transfer processing based on the read data transfer information.

17 Claims, 9 Drawing Sheets

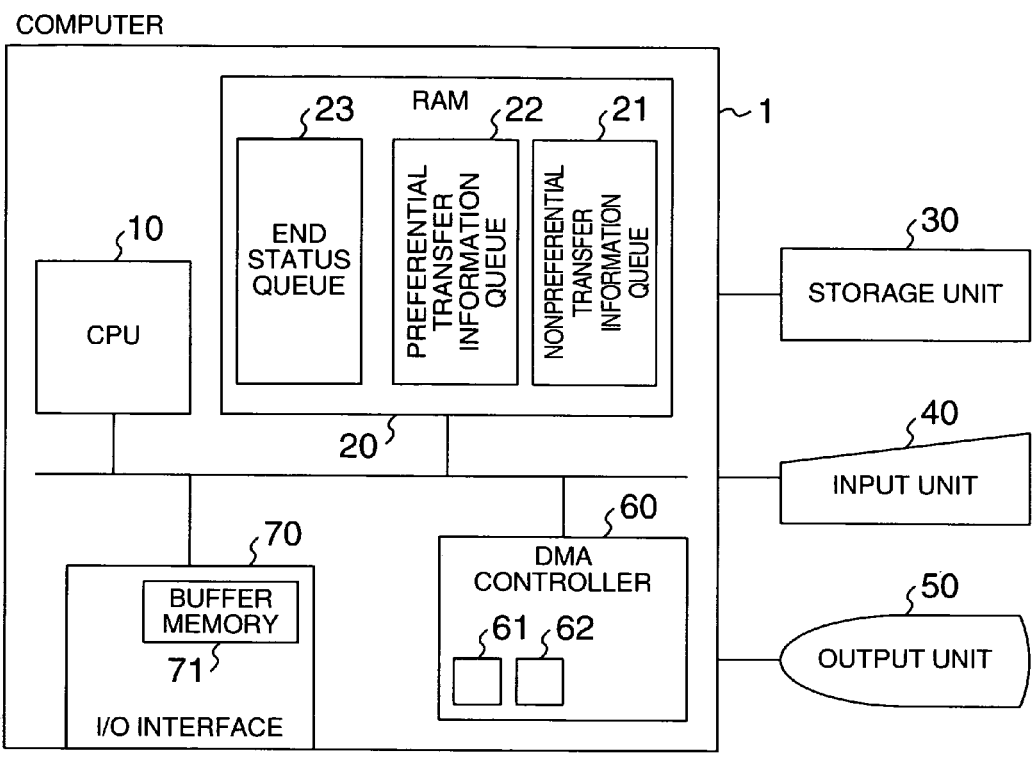

FIG. 8

| | 601 | 602 | 603 | 604 | 605 | 606 | 607 | 608 | 609 | 610 | 611 |
|---|---|---|---|---|---|---|---|---|---|---|---|
| MASK | TRANSFER BYTE NUMBER | CACHE ADDRESS | CRC | TRANSFER DIRECTION | FLAG | IDENTIFICATION INFORMATION | CHAIN FLAG | RCRC | BUFFER ADDRES | LRC |
| 0x0000 | 512 | 0x001ED000 | 0x3302 | 0 | 0 | 1 | 1 | 0x3302 | 0x0200 | 0xCE |
| 0x0270 | 512 | 0x001ED200 | 0xFD11 | 0 | 0 | 1 | 1 | 0x4782 | 0x0400 | 0x91 |
| 0x0270 | 512 | 0x001ED400 | 0x95B9 | 0 | 0 | 1 | 1 | 0xFE83 | 0x0400 | 0xED |
| 0x0270 | 512 | 0x001ED600 | 0x2083 | 0 | 0 | 1 | 0 | 0x8137 | 0x0400 | 0xA4 |
| --- | --- | --- | --- | --- | --- | --- | --- | --- | --- | --- |

| 701 | 702 | 703 | 704 |
|---|---|---|---|
| IDENTIFICATION INFORMATION | END STATUS CODE | TRANSFER PROCESS NUMBER | RCRC |
| 1 | 0x0001 | 4 | 0x0202 |
| 1 | 0x0004 | 16 | 0x0402 |
| --- | --- | --- | --- |

700

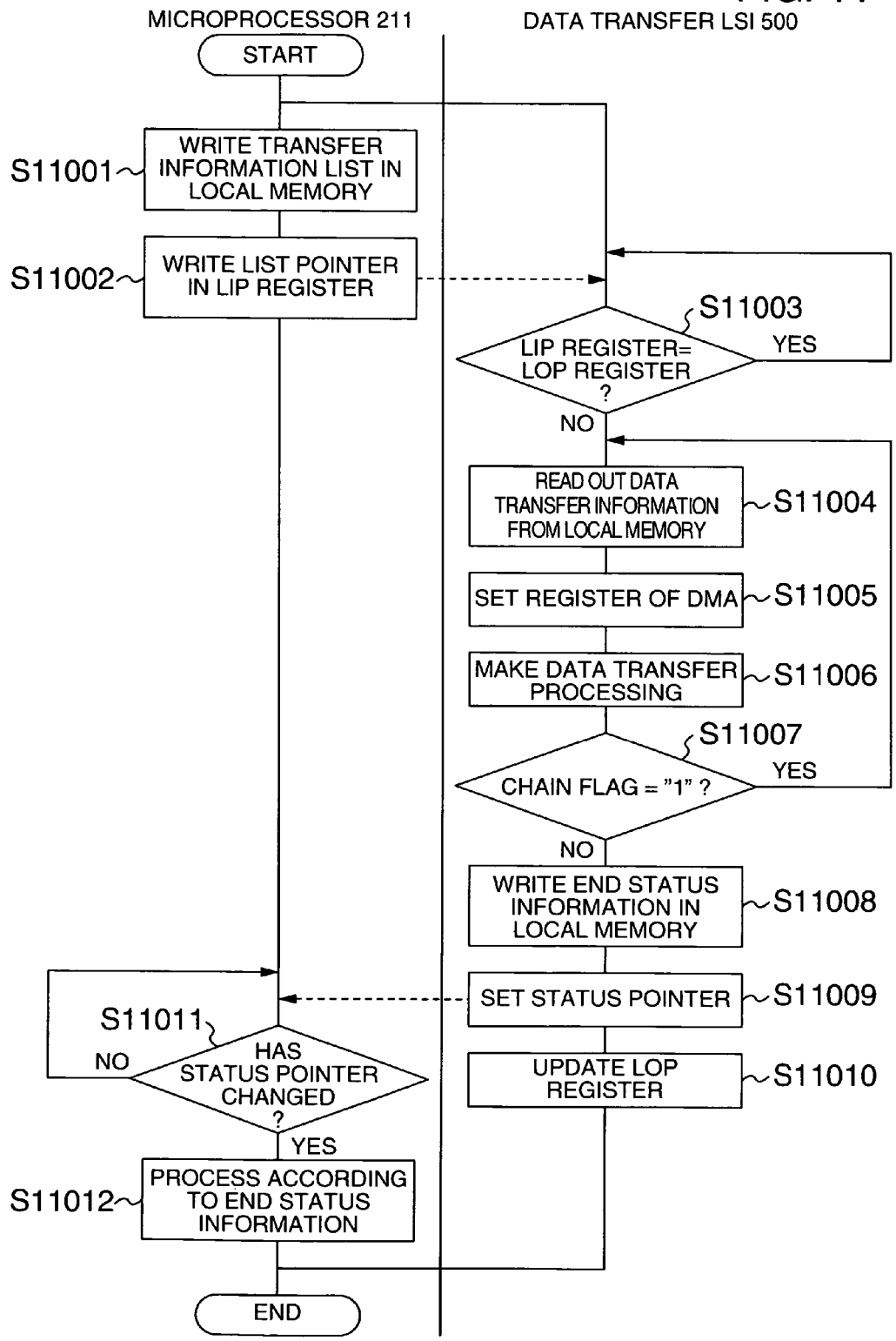

DATA TRANSFER APPARATUS, STORAGE DEVICE CONTROL APPARATUS AND CONTROL METHOD USING STORAGE DEVICE CONTROL APPARATUS

INCORPORATION BY REFERENCE

The present application claims priority from Japanese application JP2003-400512 filed on Nov. 28, 2003, the content of which is hereby incorporated by reference into this application.

BACKGROUND OF THE INVENTION

The present invention relates to data transfer apparatus, storage device control apparatus and control method using the storage device control apparatus.

Data has so far been transferred directly between memory and device not through CPU by the widely used DMA transfer technique using a DMA (Direct Memory Access) controller. When the DMA transfer occurs, the CPU gives the DMA controller the information necessary for the data transfer such as the transfer source and destination so that the information can be set in the controller, and commands it to make the data transfer processing. The DMA controller, when instructed to do the data transfer processing, transfers data not through the CPU. For example, refer to JP-A-2003-91497.

SUMMARY OF THE INVENTION

In the conventional DMA transfer processing, however, since the CPU directly sets the information such as data source and destination in the register of the DMA controller, it takes a considerable amount of time for the CPU to set this information in the DMA controller particularly when the data transfer processing is made at frequent intervals. In addition, when the DMA controller finishes the data transfer processing, it informs the CPU of this fact by a process like interruption. However, as the data transfer processing is frequently made, this notice from the DMA controller to the CPU happens quite often, thus frequently interrupting the CPU's operation.

In view of this background, the invention is to provide a data transfer control method, data transfer apparatus, storage device control apparatus, control method using the storage device control apparatus, and channel adapter that all can make efficient use of the CPU.

According to this invention, there is provided a data transfer apparatus that includes a memory having first and second queues for storing data transfer information that includes information for specifying a first memory area and information for specifying a second memory area, a first processor for causing the data transfer information to be registered in the first or second queue, and a second processor for making data transfer processing to transfer data stored in the first memory area to the second memory area, wherein the second processor reads out the data transfer information registered in the first queue, makes the data transfer processing on the basis of the read data transfer information, and decides if the data transfer information that follows the read data transfer information is registered in the first queue, in which case, if the succeeding data transfer information is registered in the first queue, the second processor reads out the succeeding data transfer information from the first queue, and makes the data transfer processing on the basis of the read data transfer information, while if the succeeding data transfer information is not registered in the first queue, the second processor reads out the data transfer information from the second queue, and makes the data transfer processing on the basis of the read data transfer information.

The invention provides a data transfer apparatus, a storage device control apparatus and a control method using the storage device control apparatus that all can make efficient use of the CPU.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing a computer according to the first embodiment of the invention.

FIG. 2 is a diagram showing one example of data transfer information according to the first embodiment of the invention.

FIG. 8 is a table showing the details of data transfer information that the data transfer LSI 500 needs for data transfer according to the second embodiment of the invention.

FIG. 9 is a table showing one example of end status information that the data transfer LSI 500 writes in local memory 212 when the data transfer LSI 500 finishes data transfer according to the second embodiment of the invention.

FIG. 11 is a flowchart showing the flow of the data transfer processing using a transfer information list according to the second embodiment of the invention.

DESCRIPTION OF THE EMBODIMENTS

Figure 3:
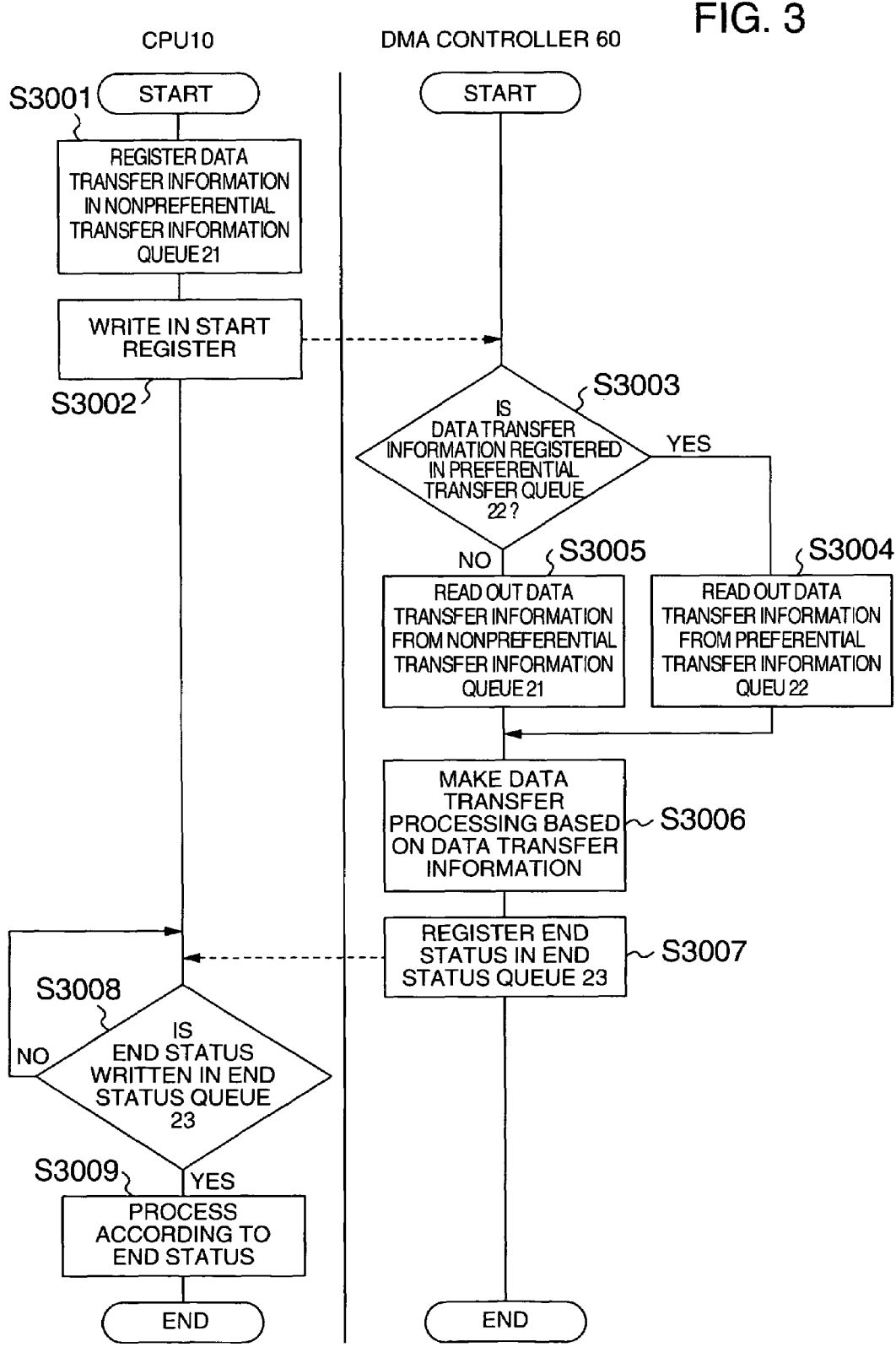
FIG. 3 is a flowchart showing the flow of data transfer processing according to the first embodiment of the invention.

Embodiments of the invention will be described in detail with reference to the accompanying drawings.

First Embodiment

FIG. 1 is a block diagram of a computer according to the first embodiment of the invention.

The computer 1 has a CPU 10, a RAM 20, a storage unit 30, an input unit 40, an output unit 50, a DMA controller 60 and an I/O interface 70.

The CPU 10 is a processor for controlling the whole computer 1. The CPU 10 timely reads out a program from the storage unit 30, writes the read program in the RAM 20, and executes the program stored in the RAM 20 to realize various different functions.

The storage unit 30 may be any storage unit such as a hard disk, flexible disk or semiconductor storage unit. The storage unit 30 may be connected to the outside of computer 1 as illustrated or incorporated within computer 1 to be integral therewith. The input unit 40 is a device that is used for the user to enter data into computer 1, such as a keyboard or mouse. The output unit 50 is a device that is used for producing information to the outside, such as a display or printer.

The I/O interface 70 is an interface through which the computer 1 communicates with external apparatus. The I/O interface 70 is, for example, a communications interface that is connected to LAN (Local Area Network) or an RS 232C interface for serial connection. The I/O interface 70 has a buffer memory 71 and it is able to store the received data in the buffer memory 71 and transmit the data stored in the buffer memory 71 to the external apparatus under the control of CPU 10.

The DMA controller 60 transfers data between a device and a memory or between memories. The DMA controller 60, when starting to transfer data in response to the instruction from CPU 10, is able to continue the data transfer processing not through the CPU 10. The DMA controller 60 can make, for example, data transfer processing for transferring data between the storage unit 30 and the buffer memory 71 of the I/O interface 70. The DMA controller 60 has a plurality of registers one of which is a start register 61. The start register 61 is a register for urging the DMA controller 60 to start operating. The DMA controller 60 starts to transfer data in response to the writing of a value in the start register 61.

In addition, another one of the registers that the DMA controller 60 has is an abort register 62. The abort register 62 is a register for terminating the operation of DMA controller 60. The DMA controller 60 ends the data transfer processing when a predetermined value is written in the abort register 62. The process for the DMA controller 60 to terminate the data transfer processing will be described later.

The RAM 20 has three queues provided. The term queue is a memory area that is controlled so that the data stored in the area can be read out according to FIFO (First In First Out). A nonpreferential transfer information queue 21 and a preferential transfer information queue 22 are the queues that the CPU 10 uses to register data transfer information in order to fix necessary data for data transfer such as the address of data transfer source and the length of data to be transferred.

The CPU 10 causes data transfer information to be registered in the nonpreferential transfer queue 21 at the time of each different running task of processes. The term task is a sequence of processes to be executed by CPU 10. The CPU 10 causes data transfer information for high-priority data transfer processing to be registered in the preferential transfer information queue 22. For example, the CPU 10, while executing a high-priority task, is able to make the necessary data transfer processing be treated as high-priority processing. In addition, it can be considered that the level of the priority to data transfer processing is previously fixed according to the kind of a task that the CPU 10 performs, and that the RAM 20 or storage unit 30 stores a corresponding table of priority and kind of task (priority manager). In this case, the CPU 10 can acquire the priority corresponding to the kind of the running task from the table and determine the queue in which the data transfer information is to be registered according to the priority. The DMA controller 60 preferentially reads out the data transfer information registered in the preferential transfer information queue 22 over that registered in the nonpreferential transfer information queue 21 and performs the data transfer processing associated with that information.

When the DMA controller 60 finishes the data transfer processing, the end status that indicates the result of the data transfer processing is registered in an end status queue 23. The end status is data that has, for example, an error code or the like fixed. The CPU 10 causes the data transfer information to be registered in the nonpreferential transfer information queue 21 or preferential transfer information queue 22. The DMA controller 60 reads out the data transfer information from the preferential transfer information queue 22. When the data transfer information is not registered in the preferential transfer information queue 22, the DMA controller 60 reads out it from the nonpreferential transfer information queue 21. The DMA controller 60 makes data transfer processing based on the read data transfer information. The DMA controller 60 causes the end status of the data transfer processing to be registered in the end status queue 23.

(Data Transfer Information)

FIG. 2 shows an example of the data transfer information. The data transfer information, as illustrated in FIG. 2, has a transfer ID column 201, a transfer direction column 202, a disk address column 203, and a transfer length column 204.

The transfer ID column 201 has entries of ID for identifying the data transfer information. The CPU 10, when generating the data transfer information, gives it an ID for identifying each piece of data transfer information, and writes it in the transfer ID column 201.

The transfer direction column 202 has entries of direction values in which data is transferred between the storage unit 30 and the buffer memory 71. If "0" is written in the transfer direction column 202, the data stored in the buffer memory 71 is transferred to the storage unit 30. If "1" is written in the transfer direction column 202, the data stored in the storage unit 30 is transferred to the buffer memory 71.

The disk address column 203 has entries of address of storage unit 30. The DMA controller 60 transfers the data stored at the address of disk address column 203 in the storage unit 30 to the buffer memory 71 or the data stored in the buffer memory 71 to the memory area that begins from the address of disk address column 203 of the storage unit 30.

The transfer length column 204 has entries of data length that is transferred between the buffer memory 71 and the storage unit 30.

The DMA controller 60 can use the above data transfer information to specify on the storage unit 30 the memory area that corresponds to the data length written in the transfer length column 204 and that begins from the address written in the disk address column 203. If "0" is written in the transfer direction column 202 of the data transfer information, the DMA controller 60 makes data transfer so that the data read from the buffer memory 71 can be transferred to the memory area of storage unit 30 that has the data length set as in the transfer length column 204 and that begins from the address set in the disk address column 203.

In this embodiment, it is assumed that the DMA controller 60 always writes at and reads from the same address of the buffer memory 71 and thus that the data transfer information has no description of any address of the buffer memory 71.

Of course, it is possible to set an address in the buffer memory 71, at or from which the DMA controller 60 writes or reads data.

(Data Transfer Processing)

FIG. 3 is a flowchart showing the flow of data transfer processing between the buffer memory 71 and the storage unit 30 in this embodiment.

The CPU 10 causes transfer information of data to be registered in the nonpreferential transfer information queue 21 or preferential transfer information queue 22 of RAM 20 (S3001). The CPU 10 makes a value be written in the start register of DMA controller 60 to order it to start the data transfer processing (S3002).

The DMA controller 60, when detecting that a value has been written in the start register, decides if data transfer information is registered in the preferential transfer information queue 22 (S3003). If data transfer information is registered in the preferential transfer information queue 22 (S3003: YES), the controller reads out the data transfer information from the preferential transfer information queue 22 (S3004). If data transfer information is not registered in the preferential transfer information queue 22 (S3003: NO), it reads out data transfer information from the nonpreferential transfer information queue 21 (S3005). The DMA controller 60 makes data transfer processing on the basis of the read data transfer information (S3006). When finishing the data transfer processing, the DMA controller 60 causes the end status be registered in the end status queue 23 (S3007).

On the other hand, the CPU 10, in an interval of the time when it is executing other processing, checks if a new end status is registered in the end status queue 23 (S3008). If the CPU 10 detects that a new end status is written in the end status queue 23 (S3008: YES), it makes a process corresponding to that end status (S3009). The process corresponding to the end status is, for example, that when the DMA controller 60 abnormally aborted the data transfer processing, a message or the like indicating that the data transfer processing was failed is sent to the output unit 50.

When the succeeding data transfer information is registered in the preferential transfer information queue 22 or nonpreferential transfer information queue 21, the DMA controller 60 continues to again process from the step (S3003) without waiting for the writing of the start register.

Although the DMA controller 60 starts to make data transfer processing when the CPU 10 writes a value in the start register of DMA controller 60 as described above, the DMA controller 60 may observe the preferential transfer information queue 21 or nonpreferential transfer information queue 22, and start to make data transfer processing when detecting that data transfer information is written in the queue 21 or 22.

Thus, as described above, the CPU 10 can order the DMA controller 60 to make a plurality of data transfer processes by successively registering data transfer information in the nonpreferential transfer information queue 21 or preferential transfer information queue 22. Since the DMA controller 60 reads out data transfer information from the preferential transfer information queue 22 or nonpreferential transfer information queue 21 and makes data transfer processing on the basis of the read-out data transfer information, it can make data transfer processing in an asynchronous manner independently of the process in which the CPU 10 sets necessary data for data transfer processing as the data transfer information and causes it to be registered in the nonpreferential transfer information queue 21 or preferential transfer information queue 22.

According to the invention, since the first processor (CPU 10) causes data transfer information to be registered in the queue (nonpreferential transfer information queue 21 or preferential transfer information queue 22) provided in the memory (RAM 20), it does not directly interact with the second processor (DMA controller 60), but it can order the second processor to make the data transfer processing. Therefore, the first processor does not require to receive the end notice from the second processor each time the data transfer processing is finished, and thus it can make other processes. Accordingly, it is possible to efficiently use the first processor.

The first processor (CPU 10) is able to control the order of data transfer processes by, for example, causing the data transfer information for high-priority data transfer processes to be registered in the head of the second queue (nonpreferential transfer information queue 21). However, if the second processor (DMA controller 60) read the data transfer information from the second queue during the time in which the first processor was changing the order of the pieces of the data transfer information to be registered in the second queue, the data transfer processes would not be performed in the order of high-priority processes that the first processor had planned for. Therefore, in order that the order of the pieces of the data transfer information registered in the second queue can be changed to make high-priority processes come to the beginning, it would be necessary that the first processor interrupt the operation of the second processor.

However, according to the invention, the second processor preferentially reads out the data transfer information registered in the first queue (preferential transfer information queue 22) over that registered in the second queue. Therefore, the first processor causes the data transfer information about high-priority data transfer processes to be registered in the first queue, thereby achieving the same effect as it registers the data transfer information in the second queue at the head. Thus, the first processor does not need to interrupt the operation of the second processor, while the data transfer processes can be preferentially performed in the order of processes that is specified by the data transfer information registered in the first queue. In other words, the first processor can easily control the order of data transfer processes to be executed.

In addition, the first processor can make the data transfer processes be performed preferentially according to the data transfer information registered in the first queue without changing the order of arrangement of the data transfer information registered in the second queue. Thus, when data transfer information is registered according to the priority level, it is possible to suppress the necessary access to the memory, and hence to achieve efficient data transfer processing.

Moreover, the first processor can grasp the results of the data transfer processing that the second processor has performed by referring to the memory (end status queue 23). Therefore, the first processor does not need to receive the notice of having finished processes directly from the second processor, but it can acquire the results of the data transfer processes that the second processor has finished indirectly through the memory. Accordingly, the first processor is able to efficiently operate.

In addition, since the clock at which the CPU 10 operates is generally faster than that used for the DMA controller 60, the time taken for the CPU 10 to access to RAM 20 is often shorter than that required for it to access to the register of DMA controller 60. Therefore, according to the invention, the CPU 10 requires smaller amounts of time to fix the information for the data transfer processes to the DMA controller 60, and thus it can more efficiently operate.

When reading out the data transfer information from the RAM 20, the DMA controller 60 may take burst transfer along the bus that connects the DMA controller 60 and the RAM 20. Thus, the DMA controller 60 can read out data along the bus with high utilization efficiency. Thus, the whole computer 1 can make efficient transfer processing.

Moreover, in general, when the CPU 10 causes the DMA controller 60 to continuously perform data transfer processes, the CPU 10, after detecting that the DMA controller has finished data transfer processing, needs to fix necessary information for the successive data transfer in the DMA controller 60. According to the invention, the CPU 10 can write necessary information for data transfer processes in the PAM 20 irrespective of how the DMA controller 60 is operating. Therefore, the CPU 10 can order the DMA controller 60 to make a plurality of data transfer processes.

Furthermore, the CPU 10 may fix the degree of priority at each task to be executed and determine the queue in which data transfer information is to be registered according to the degree of priority. Thus, the CPU 10 can make it possible that the data transfer processes to be executed according to a high-priority task can be preferentially performed over those to be executed according to a low-priority task.

(Data Transfer Aborting Process)

It can be here considered that the data transfer information already registered in the queue (nonpreferential transfer information queue 21 or preferential transfer information queue 22) by the first processor (CPU 10) is, for example, changed in its contents or deleted from the queue by the first processor. At this time, if the second processor (DMA controller 60) read the data transfer information that was being changed by the first processor, and performed the data transfer processing on the basis of that data transfer information, the data transfer processing might be made between memory areas different from those on which it would be tried to make by the command from the first processor. In addition, if the second processor made data transfer processing on the basis of the data transfer information that was tried to delete from the queue by the first processor, it would end up uselessly making the data transfer processing. This might reduce not only the efficiency of the operation of the second processor but also the data transfer efficiency of the whole data transfer apparatus. Therefore, the first processor would need to temporarily stop the second processor from the data transfer processing and to prevent it from reading out the data transfer information that the first processor was trying to change or delete. However, if the data transfer process that was being executed by the second processor was stopped, it would need to be reattempted, and thus it might take a long time for the data transfer as a whole. Thus, according to the invention, the second processor, after the completion of data transfer processing, detects an abort command in the register (abort register 62), this command indicating to abort the data transfer processing, and stops the succeeding data transfer processing.

A description will be made of the process for the first processor to stop the second processor from the data transfer processing.

The CPU 10 sets a predetermined value in the abort register 62 of DMA controller 60 to order the DMA controller 60 to abort the data transfer processing. As the predetermined value set in the abort register 62, there are two kinds of commands: an abort command to stop the processing at the time when the data transfer processing based on certain data transfer information has been finished, and a forced termination command to immediately stop the running data transfer processing. The abort command has a value of, for example, "0x0001". The forced termination command has a value of, for example, "0x0002".

Figure 4:
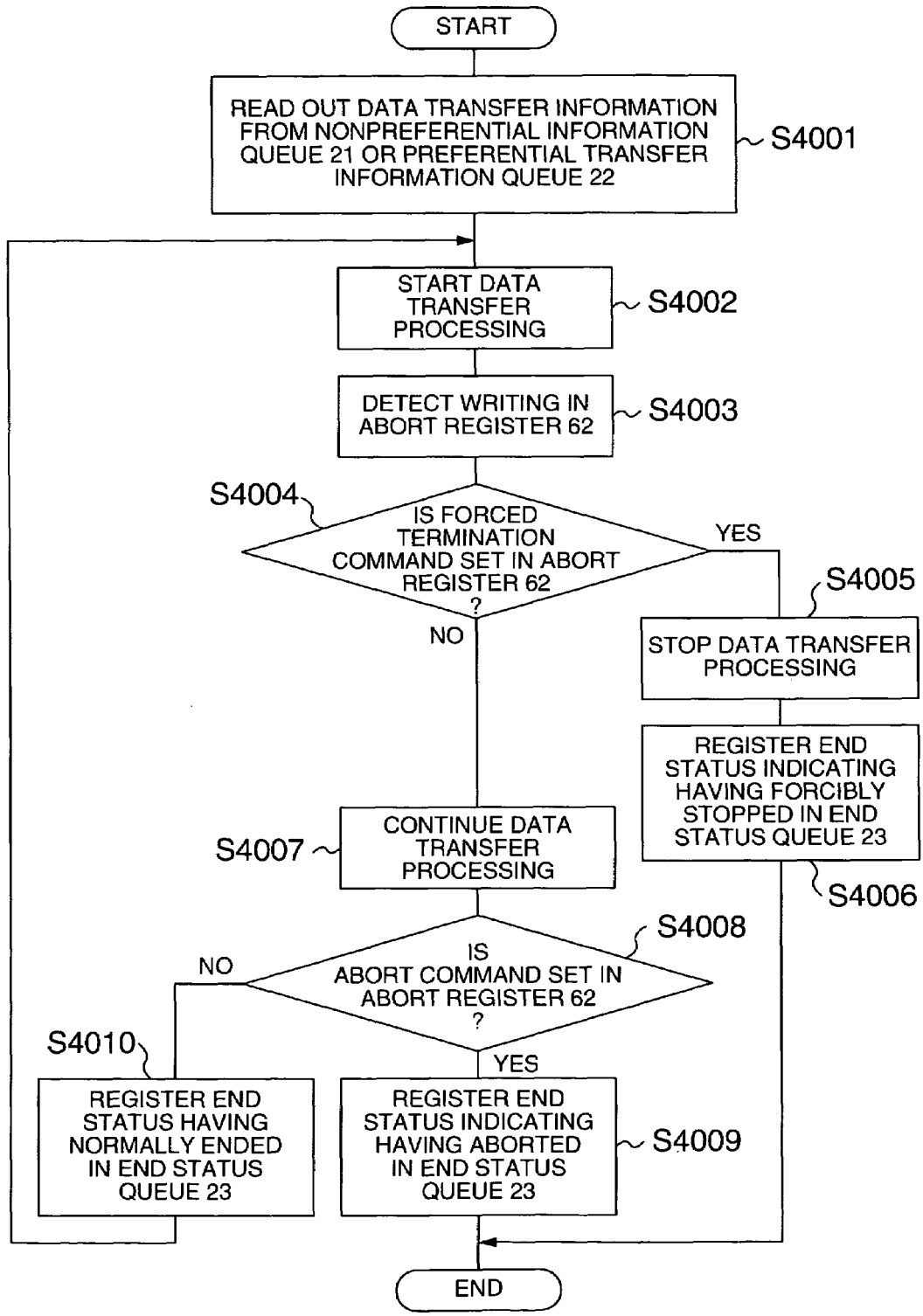
FIG. 4 is a flowchart showing the flow of processes for DMA controller 60 to stop the data transfer processing according to the first embodiment of the invention.

FIG. 4 is a flowchart showing the flow of processes for the DMA controller 60 to stop the data transfer processing. The CPU 10 causes data transfer information to be registered in the nonpreferential transfer information queue 21 or preferential transfer information queue 22 and writes a value in the start register 61 of DMA controller 60, thus causing the DMA controller 60 to start data transfer processing.

The DMA controller 60 reads out the data transfer information from the preferential transfer information queue 22 when it detects the writing of a value in the start register 61. If no data transfer information is registered in the queue 22, the controller 60 reads out the data transfer information from the nonpreferential transfer information queue 21 (S4001). The DMA controller 60 starts to transfer data between the buffer memory 71 and the storage unit 30 on the basis of the read data transfer information (S4002).

When detecting the writing of a value in the abort register 62 (S4003), the DMA controller 60 refers to the abort register 62 and decides if the forced termination command is set in the abort register 62 (S4004). If this command is set in the abort register 62 (S4004: YES), the DMA controller 60 stops the running data transfer processing (S4005). The DMA controller 60 generates the end status indicating that the data transfer processing has been forcibly stopped, causes the generated end status to be registered in the end status queue 23 (S4006), and ends the operation.

If the forced termination command is not set in the abort register 62 (S4004: NO), the DMA controller 60 continues the data transfer processing even if the abort command is written in the abort register 62 (S4007). The DMA controller 60, after making the data transfer processing between the buffer memory 71 and the storage unit 30, refers to the abort register, checking if the abort command is set in the abort register 62 (S4008). If the abort command is set in the abort register 62 (S4008: YES), the DMA controller 60 stops the following data transfer processing. The DMA controller 60 generates the end status indicating that the following processing has been stopped, and causes this end status to be registered in the end status queue 23 (S4009). If the abort command is not set in the abort register 62 (S4008: NO), the DMA controller 60 generates the end status indicating that the data transfer processing has been normally finished, and causes the end status to be registered in the end status queue 23 (S4010). Then, it proceeds back to step (S4002), and makes data transfer processing about the succeeding data transfer information registered in the preferential transfer information queue 22 or nonpreferential transfer information queue 21.

According to the invention, as described above, the second processor (DMA controller 60) stops the succeeding data transfer processing if the abort command is set in the register (abort register 62) after the completion of the data transfer processing. Therefore, the second processor never interrupts the running data transfer processing on the way. In addition, the first processor (CPU 10) is able to send the abort command to the second processor, ordering it to abort the processing without monitoring if the second processor has completed the data transfer processing and without receiving the notice of completion from the second command. Therefore, the first processor can easily control the second processor by setting the abort command in the register of the second processor so that when the second processor has completed the data transfer processing, the succeeding data transfer processing can be stopped. Accordingly, the first processor can make efficient operation, and when the second processor is stopped from the data transfer processing, the transfer ability of the whole data transfer apparatus (computer 1) can be suppressed up to the minimum from being reduced.

If the first processor cannot confirm that the second processor has stopped the data transfer processing a certain time after the abort command is set in the register of the second processor, it may write the forced termination command in the register so that the second processor can forcibly terminate the data transfer processing. Thus, if the second processor is brought to the stand-by mode without completing the data transfer processing, the first processor can control the second processor to forcibly stop the data transfer processing. Therefore, when the first processor causes the second processor to stop the data transfer processing, the second processor can stop the data transfer processing within a predetermined time after the abort command has issued. Thus, the first and second processors can contribute to efficient data transfer processing. In addition, it is possible to suppress the reduction of the data transfer ability of the whole data transfer apparatus.

Thus, when the DMA controller 60 has finished the data transfer processing, the CPU 10 can stop the following data transfer processing. When the DMA controller 60 stops the data transfer processing, the CPU 10 performs, for example, updates the contents of the data transfer information registered in the queue (nonpreferential transfer information queue 21 or preferential transfer information queue 22) or deletes it from the queue. Then, the CPU 10 writes "0" in the abort register 62 of DMA controller 60 to clear the abort command or forced termination command set in the abort register 62. When a value is written in the abort register 62, the DMA controller 60 refers to the value set in the abort register 62. If the value set in the abort register is not the abort command or forced termination command, the DMA controller 60 reads out the data transfer information from the preferential transfer information queue 22 or nonpreferential transfer information queue 21, and resumes the data transfer processing.

The DMA controller 60 may have, for example, a resume register for resuming the data transfer processing so that the CPU 10 can set a value in this resume register in place of writing "0" in the abort register 62, thus ordering the DMA controller 60 to resume the data transfer processing.

In addition, the start register, the abort register and the above resume register can make, for example, one register (control register). In this case, the DMA controller 60 can start, stop, forcibly terminate or resume the data transfer processing depending upon whether "1" is set or not at a predetermined bit position of the value written in this control register.

(Deletion of Registered Data Transfer Information)

When the data transfer information registered in the queue (nonpreferential transfer information queue 21 or preferential transfer information queue 22) is deleted, the CPU 10 can write a value instructing not to make data transfer processing in the transfer length column 204 of the data transfer information to be deleted. The value instructing not to make data transfer processing is, for example, "0". It may be a value such as "−1" that is not usually used for data length. When this value instructing not to make data transfer processing is set in the transfer length column 204 of the data transfer information read from the preferential transfer information queue 22 or nonpreferential transfer information queue 21, it can cause the DMA controller 60 not to make the data transfer processing.

The CPU 10 is also able to cancel the transfer of data about the data transfer information already registered in the queue by deleting the data transfer information from the queue (nonpreferential transfer information queue 21 or preferential transfer information queue 22). However, also the CPU 10 is able to cancel the transfer of data about the data transfer information registered in the queue only by setting the value instructing not to make data transfer processing in the transfer length column 204 of the data transfer information registered in the queue. In other words, the CPU 10 can achieve the same effect as when the data transfer information is deleted from the queue only by updating the contents of the transfer length column 204 of the data transfer information registered in the queue. Therefore, the frequency of the access from the CPU 10 to the RAM 20 is reduced when the CPU 10 sets a value in the transfer length column of the data transfer information registered in the queue rather than when it deletes the data transfer information from the queue. Thus, the access from the CPU 10 to the RAM 20 becomes less severe as a burden on the data transfer processing, so that the CPU 10 can efficiently operate. In addition, when deleting the data transfer information from the queue, the CPU 10 causes the DMA controller 60 to stop the data transfer processing. Therefore, the frequency of the access from the CPU 10 to the RAM 20 is reduced, thus shortening the processing time necessary to cancel the data transfer processing so that the time in which the DMA controller 60 keeps the data transfer processing interrupted can also be reduced. This can suppress the reduction of the data transfer ability of computer 1 due to the canceling of the data transfer processing.

Thus, by alleviating the load of processing on the CPU 10 and shortening the time in which the DMA controller 60 is kept stopped from processing, it is possible to improve the efficiency of data transfer processing of the whole computer 1.

Second Embodiment

A description will be made of another embodiment of the invention applied to a storage device control apparatus.

Figure 5:
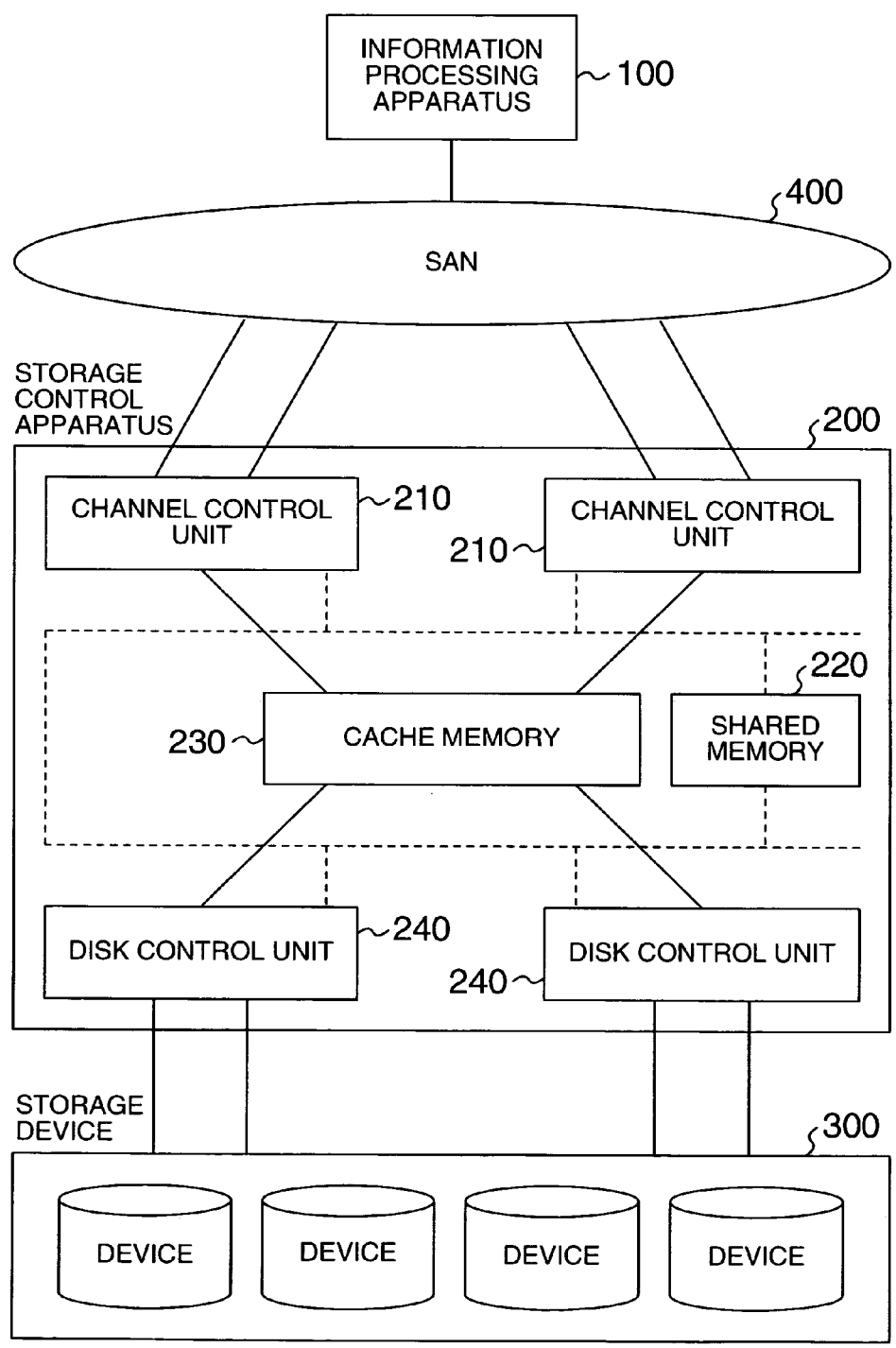
FIG. 5 is a block diagram showing the whole arrangement of an information processing system as the second embodiment of the invention.

FIG. 5 is a block diagram of the whole construction of an information processing system that will be described as the second embodiment of the invention.

Information processing apparatus 100 and a storage device control apparatus 200 are connected to a network 400 so that they can be intercommunicated through the network 400. The network 400 is, for example, SAN (Storage Area Network). The network 400 may be LAN (Local Area Network) other than SAN. The protocol for the network 400 may be any one of fiber channel, ESCON (registered trademark), FICON (registered trademark) and SCSI (Small Computer System Interface).

The information processing apparatus 100 is a computer that offers information-processing service by using the memory resource that the storage device control apparatus 200 provides. The information processing service offered by the information processing apparatus 100 is, for example, the automatic teller machine system of bank or the seat reservation system of aircrafts. The information processing apparatus 100 has a CPU (Central Processing Unit) and a memory so that various different functions can be created when the CPU executes various programs. The information processing apparatus 100 can serve as a mainframe computer, workstation, personal computer or the like.

A storage device 300 has multiple disk drives, and supplies memory areas to the information processing apparatus 100. The disk drive may be any one of, for example, a hard disk drive, flexible disk drive and semiconductor storage device. The storage device 300 can also be formed as a disk array by using a plurality of disk drives. In this case, the memory areas supplied to the information processing apparatus 100 can be provided by a plurality of disk drives that are managed by RAID (Redundant Array of Independent Disks).

The storage device control apparatus 200 accepts a request for input/output of data to the storage device 300 from the information processing apparatus 100, and makes processing about input/output of data to the storage device 300. The storage device control apparatus 200 includes a channel control unit 210, a shared memory 220, a cache memory 230, and a disk control unit 240. The channel control unit 210 has communications interfaces through which it communicates with the information processing apparatus 100, and a function to receive the request for input/output of data to the storage device 300 from the information processing apparatus 100. The channel control unit 210 is responsive to the received data input/output request to send a command to the disk control unit 240, ordering it to make input/output of data to the storage device 300. The disk control unit 240 responds to this command to make processing about the input/output of data to the storage device 300. The shared memory 220 is a memory shared by the channel control unit 210 and disk control unit 240, and stores, for example, the above-given command to control the input/output of data. The cache memory 230 stores data that is transmitted and received between the channel control unit 210 and the disk control unit 240.

The physical volume as physical memory areas provided by the disk drives of the storage device 300 has a logic volume set as logic memory areas. The storage device control apparatus 200 controls the input/output of data to this logic volume. When the information processing apparatus 100 transmits an input/output data request for writing data to the logic volume (hereinafter, called the data write request) to the storage device control apparatus 200, the channel control unit 210 receives the data write request. The channel control unit 210 responds to the received data write request to generate a command to write data (hereinafter, called the data write command) and cause the shared memory 220 to store this command. In addition, the data to be written received from the information processing apparatus 100 is stored in the cache memory 230. The disk control unit 240 reads out the data write command from the shared memory 120 and makes processing by which the data stored in the cache memory 230 is written in the storage device 300 on the basis of the read command. The data write command stored in the shared memory 220 under the control of the channel control unit 210 and the data written in the cache memory 230 under the control of the channel control unit 210 can also be transmitted directly to the disk control unit 240 from the channel control unit 210.

(Channel Control Unit)

The channel control unit 210 sometimes makes the following processing except the data input/output processing according to the data input/output request received from the information processing apparatus 100.

In some cases, the channel control unit 210 makes, for example, copying of the data stored in a first logic volume into a second logic volume different from the first logic volume (hereinafter, referred to as local copy processing) in order to further enhance the maintainability of the data stored in the first logic volume of the storage device 300.

In addition, the channel control unit 210 sometimes makes copying of the data stored in the first logic volume into a third logic volume that other storage device control apparatus 200 controls (hereinafter, called journal copy processing) in order to further enhance the maintainability of the data stored in the first logic volume. In this case, the channel control unit 210 of the first storage device control apparatus 200 and the channel control unit 210 of the second storage device control apparatus 200 are connected so that they can intercommunicate. The first storage device control apparatus 200 transmits the data stored in the first logic volume to the second storage device control apparatus 200. Thus, even if a failure occurs in the first storage device control apparatus 200, the information processing apparatus 100 is able to access to the second logic volume of the second storage device control apparatus 200, or the so-called fail over can be achieved.

In the case when the channel control unit 210 of the first storage device control apparatus 200 transmits the data stored in the first logic volume to the second storage device control apparatus 200, the transmitting of all data stored in the first logic volume each time data is written in the first logic volume will take much time for the transfer processing and increase the traffic in the communication pathway. Thus, the channel control unit 210 transmits only the information by which the data stored in the first logic volume is updated (update history). This update history is called journal.

The channel control unit 210, when receiving the data write request for writing data to the first logic volume from the information processing unit 100, generates the data write command to the first logic volume and controls the shared memory 120 to store it (the command may be transmitted to the disk control unit 240). In addition, the channel control unit 210 controls the copy of the data written in the first logic volume (hereinafter, called journal data) to be written in the second logic volume. Also, the channel control unit 210 generates meta data that includes the time at which the data write command is generated (the time at which the data is written in the first logic volume), the address of the first logic volume specified by the data write request, the data length of the written data, and the address of the second logic volume in which the journal data has been written. The above journal is the data including this meta data and the journal data. As described above, the channel control unit 210 of the first storage device control apparatus 200 generates the journal in response to the data write request (hereinafter, called journal generation processing), and transmits the generated journal to the second storage device control apparatus 200. The channel control unit 210 of the second storage device control apparatus 200 updates the second logic volume on the basis of the received journal. The processing for the channel control unit 210 to receive the journal is called journal acquisition processing. Also, the processing that the channel control unit 210 makes to update the logic volume on the basis of the journal is called restore processing. Thus, the first and second logic volumes can have the same information content by intercommunication between the two different storage device control apparatus 200.

Moreover, the channel control unit 210 sometimes makes the processing for acquiring the data stored in the logic volume in the past (namely, snapshot processing).

The channel control unit 210 receives a command to make the snapshot processing (called snapshot command) from the information processing apparatus 100 and starts the snapshot processing according to the received snapshot command. When the channel control unit 210 receives the data write command to the first logic volume from the information processing apparatus 100 after the start of the snapshot processing, it does not cause the data not to be stored in the first logic volume, but generates the data write command to write the data in the second logic volume. The channel control unit 210 makes the address of the first logic volume specified by the data write request be associated with that of the second logic volume in which the data is actually written, and causes them to be stored as a management table. The channel control unit 210 refers to the management table, thereby making it possible to decide if the most recent data to be stored in the first logic volume is stored either in the first logic volume or in the second logic volume.

The channel control unit 210, when receiving the data read request from the information processing apparatus 100, decides if the latest data to be stored in the address of the first logic volume specified by the received data read request is stored either in the first logic volume or in the second logic volume. The channel control unit 210 reads out the current data from the first or second logic volume according to the result of the decision. The channel control unit 210 sends the read data back to the information processing apparatus 100 in response to the data read request.

The information processing apparatus 100 can also transmit the snapshot data read request for reading out the data corresponding to the time point at which the snapshot command has been transmitted. The channel control unit 210 can acquire the data corresponding to the time point at which the snapshot processing has been started by reading out the data stored in the first logic volume. Therefore, the channel control unit 210, when receiving the snapshot data read request, reads out the data from the first logic volume and sends it back to the information processing apparatus 100.

When receiving the data write request to the first logic volume, the channel control unit 210 may copy the data stored in the first logic volume into the second logic volume, and write the latest data in the first logic volume. In this case, when the channel control unit 210 receives the snapshot data read request, it reads out the data from the first or second logic volume in accordance with the address specified by the request, and sends it back to the information processing apparatus 100.

The storage device control apparatus 200 makes the above local copy processing, journal generation processing, journal acquisition processing and restore processing so that the data stored in the logic volume can be made to have redundancy and to enhance the maintainability of the data. In addition, the storage device control apparatus 200 makes the snapshot processing to thereby read out the data stored in the past.

Figure 6:
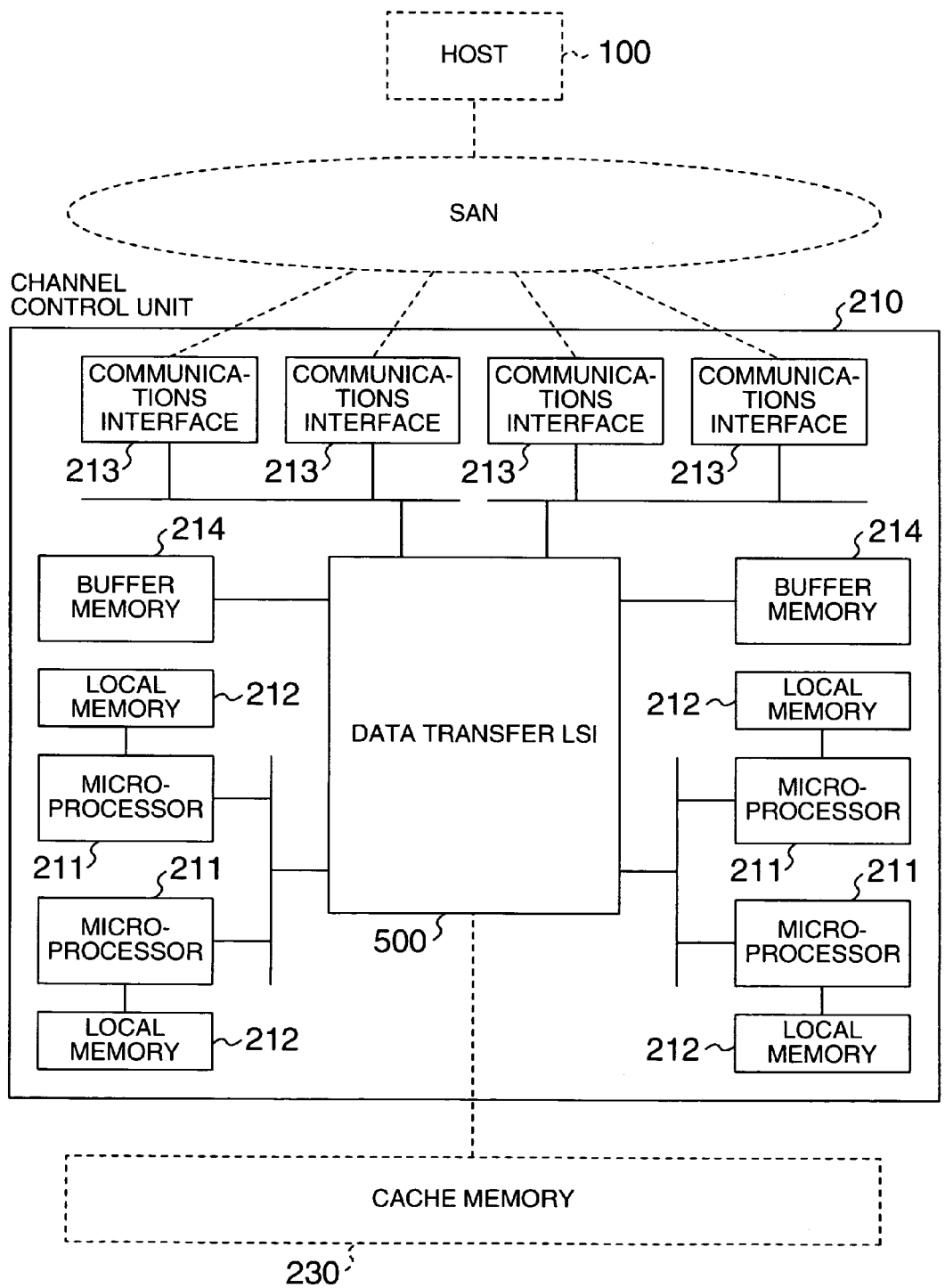
FIG. 6 is a block diagram showing the hardware construction of channel control unit 210 according to the second embodiment of the invention.

The construction of the channel control unit 210 will be described below. FIG. 6 is a block diagram of the hard ware construction of the channel control unit 210. As illustrated in FIG. 6, the channel control unit 210 has microprocessors 211, local memories 212, communications interfaces 213, buffer memories 214, and a data transfer LSI 500. These elements are built within the same unit. The channel control unit 210 can be integrally incorporated in the storage device control apparatus 200 or constructed as a detachable channel control unit independently of the storage device control apparatus 200.

While the channel control unit 210 has four microprocessors 211, four local memories 212, four communications interfaces 213, two buffer memories and one data transfer LSI 500 as shown in FIG. 6, the numbers of those elements are not limited to such numbers. For example, it may have a structure having one microprocessor 211 and two data transfer LSIs 500. When the channel control unit 210 has a plurality of data transfer LSIs 500, the microprocessor 211 needs to inform each of multiple data transfer LSIs 500 of data transfer information. According to the invention, since the microprocessor 211 can perform the processing to be performed next without waiting for the notice from the data transfer LSI 500, the microprocessor 211 can send the data transfer information indirectly through a memory to each data transfer LSI 500. Therefore, the efficiency of the data transfer processing can be increased. The data transfer processing according to this embodiment will be described later in detail.

The microprocessor 211 is a processor that controls the whole channel control unit 210. The microprocessor 211 performs the above-given local copy processing, journal generation processing, journal acquisition processing, restore processing and snapshot processing by executing the program stored in the local memory 212, thus offering various different functions. The four microprocessors 211 shown in FIG. 6 each independently interpret the data input/output request received from the communications interfaces 213, and order the data transfer LSI 500 to transfer data according to the received data input/output request and the disk control unit 240 to read out the data from the storage device 300.

Various programs and data are stored in the local memories 212. In the channel control unit 210 of this embodiment, the microprocessors 211 each manage one different local memory 212. The local memories 212 are connected through buses to the microprocessors 211. In addition, the local memories 212 are also indirectly connected through the buses provided within each microprocessor 211 to the data transfer LSI 500. The local memories 212 store the programs that the microprocessors 211 execute and the data utilized by the programs.

The communications interface 213 is an interface that communicates with the information processing apparatus 100. This interface has a communications connector for the communication between the interface and the information processing apparatus 100. In the channel control unit 210, the communications interface uses a protocol of, for example, fiber channel, SCSI, FICON (registered trademark), ESCON (registered trademark), ACONARC (registered trademark) or FIBARC (registered trademark) to receive the data input/output request transmitted from the information processing apparatus 100 according to the protocol. The communications interfaces 213 force the buffer memories 214 to store the received data. In addition, the communications interfaces 213 can make the data stored in the buffer memories 214 be transmitted to the information processing apparatus 100.

The microprocessor 211 responds to the data input/output request that the communications interface 213 receives from the information processing apparatus 100 to make processing of data input/output to the storage device 300, for example, to generate the data write command, as hereinafter called the I/O processing. In addition, the microprocessor 211 makes other processes such as the above local copy processing, journal generation processing, journal acquisition processing, restore processing and snapshot processing, as hereinafter called the internal processing.

The data transfer LSI 500 transfers data between device and memory or between memories, as does the DMA controller 60 that the computer 1 has in the first embodiment mentioned above. In this embodiment, the data transfer LSI 500 transfers data mainly between the buffer memory 214 and the cache memory 230. This data transfer processing is performed as a part of the data input/output processing according to the data input/output request that the storage device control apparatus 200 has accepted from the information processing apparatus 100. When the communications interface 213 receives the data input/output request, the microprocessor 211 generates the data transfer information according to the received data input/output request, and controls the local memory 212 to write this generated data transfer information. The data transfer LSI 500 reads out the written data transfer information from the local memory 212, and transfers the data on the basis of the read data transfer information. If the channel control unit 210 receives the data write request from the information processing apparatus 100, the data transfer LSI 500 transfers to the cache memory 230 the data that is received by the communications interface 213 and stored in the buffer memory 214. The data transfer LSI 500 also makes the data transfer processing between the buffer memory 214 and the cache memory 230 about the data that this storage device control apparatus 200 transmits to or receives from other apparatus than the information processing apparatus 100 as, for example, when it is connected to other different storage device control apparatus 200 and copies the data stored in the storage device 300 into the corresponding storage device.

(Data Transfer LSI)

Figure 7:
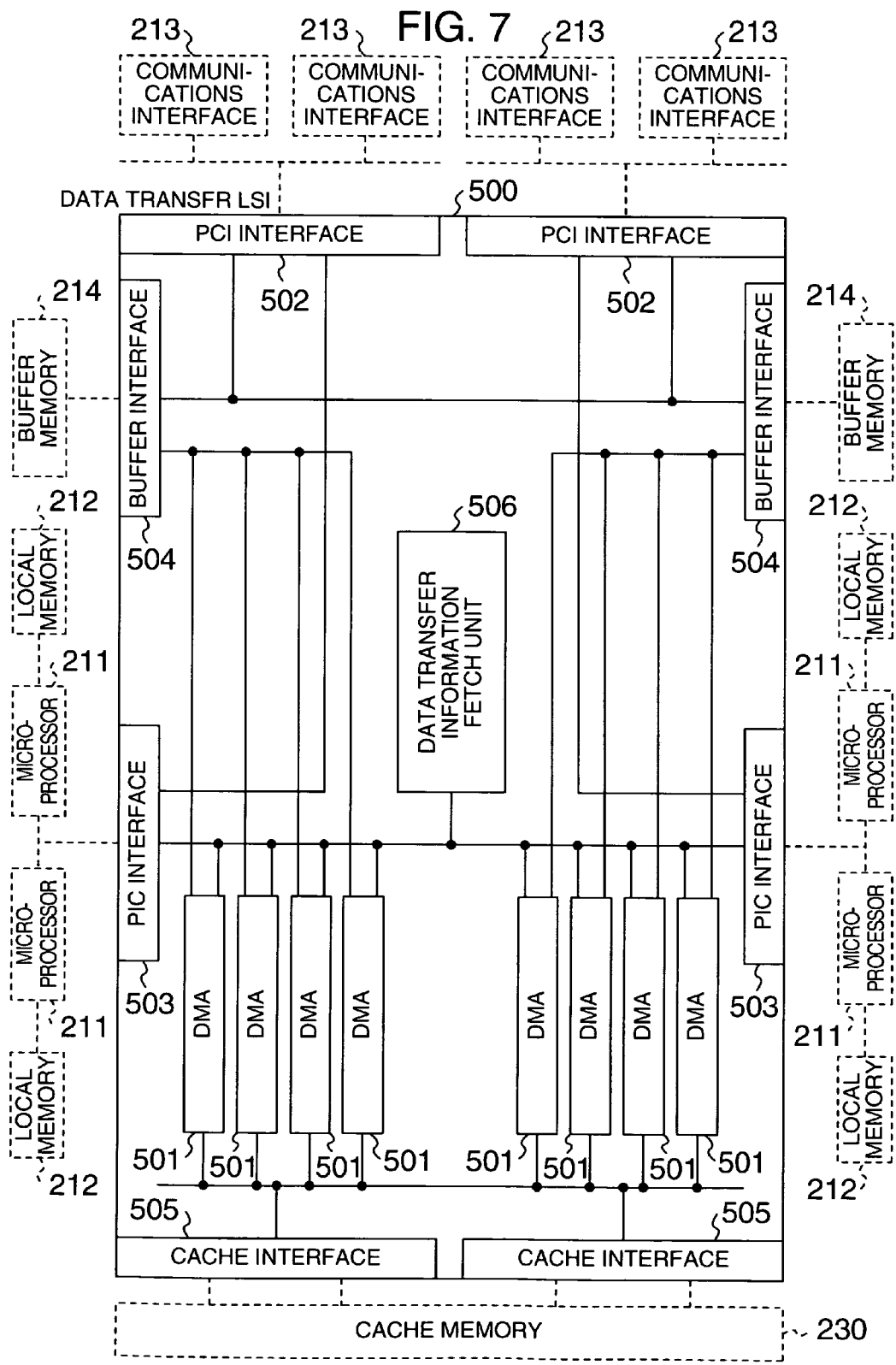
FIG. 7 is a block diagram showing the construction of data transfer LSI 500 according to the second embodiment of the invention.

FIG. 7 is a block diagram showing the construction of the data transfer LSI 500.

The data transfer LSI 500 has DMAs 501, PCI interfaces 502, PCI interfaces 503, buffer interfaces 504, cache interfaces 505 and a data transfer information fetch unit 506.

The PCI interfaces 502 are connected to a PCI bus and transmit and receive data to and from the PCI bus. The data transfer LSI 500 is connected through the PCI interfaces 502 to the communications interfaces 213.

The PCI interfaces 503 are also connected to the PCI bus, as are the PCI interfaces 502. The data transfer LSI 500 is connected through the PCI interfaces 503 to the microprocessors 211 and local memories 212.

The data transfer LSI 500 may be connected through the same PCI bus to the communications interfaces 213, microprocessors 211 and local memories 212. In this case, provision of at least one PCI interface will be sufficient for the data transfer LSI 500. In addition, the PCI interfaces 502 and PCI interfaces 503 may be connected to external apparatus through a bus other than the PCI bus.

The buffer memories 214 are used to temporarily store the data that the channel control unit 210 transmits to or receives from the information processing apparatus 100. The buffer interfaces 504 control the transmission and reception of data to and from the buffer memories 214.

The cache interfaces 505 transmit and receive data to and from the cache memory 230. The cache interface 505 may have a buffer memory for more efficient data transfer.

The DMA 501 is, for example, a DMA (Direct Memory Access) processor. The DMA 501 can transfer the data stored in the memory area of a data transfer source to the memory area of a data transfer destination by fixing the information for specifying the memory area of the data transfer source and the memory area of the data transfer destination. The DMA 501 may be other than the DMA processor, for example, a program to be executed on a processor such as the microprocessor or may be a logic circuit incorporated on an IC for special applications.

The data transfer information fetch unit 506 reads out necessary information for data transfer from the local memories 212 and sets it in the registers of DMAs 501. The data transfer information fetch unit 506 can be constructed as, for example, a special-purpose IC or microprocessor.

The data transfer LSI 500 may have no data transfer information fetch unit 506, but instead take the construction capable of direct access by the DMAs 501 to the local memories 212.

(Data Transfer Information)

FIG. 8 is a table showing details of the data transfer information necessary for the data transfer LSI 500 to make the data transfer processing. The data transfer information 600 has a mask column 601, a transfer byte number column 602, a cache address column 603, a CRC column 604, a transfer direction column 605, a flag column 606, an identification information column 607, a chain flag column 608, an RCRC column 609, a buffer address column 610 and an LRC column 611.

The microprocessor 211 writes a plurality of pieces of data transfer information 600 continuously in a memory area beginning from a predetermined address of the local memory 212. Thus, the data transfer LSI 500 can read out each of a plurality of pieces of data transfer information continuously from the memory. In other words, a queue in which a transfer information list is registered is formed on the local memory 212.

In addition, the microprocessor 211 manages the data transfer information 600 necessary for a sequence of data transfer processes-so that a group of data transfer information 600 (hereinafter, called the transfer information list) formed by a predetermined number of pieces of data transfer information 600 can be processed as a unit. The sequence of data transfer processes means a plurality of data transfer processes that the data transfer LSI 500 makes, for example, when the memory area of the data transfer source or transfer destination on the cache memory 230 is discontinuous in association with the data transfer to be made in response to one data input/output request received by the channel control unit 210.

Each column of data transfer information 600 will be described below.

The mask column 601 has entries of the information indicating which column values are to be copied into each column of information 600 in order to inherit the values set in the respective columns of the data transfer information 600 that the data transfer LSI 500 has processed just before the data transfer information 600 belonging to the related transfer information list.

The transfer byte number column 602 has entries of values of data length to be transferred.

The cache address column 603 has entries of the addresses on cache memory 230 that are used as the source or destination of the data transfer that the data transfer LSI 500 makes.

The CRC column 604 has entries of error detecting code on the data to be transferred. For example, the microprocessor 211 computes a CRC code by using the CRC (Cyclic Redundancy Check) on the data to be transferred and sets it on the CRC column 604. The data transfer LSI 500, when making the data transfer, can use the value set in this column to decide if the data to be transferred has error. If the data to be transferred is decided to have error, the data transfer LSI 500 can stop the data transfer processing.

The transfer direction column 605 has entries of values indicating whether the data transfer LSI 500 transfers the data stored in the cache memory 230 to the buffer memory 214 or transfers the data stored in the buffer memory 214 to the cache memory 230. The transfer direction column 605 has, for example, "0" set when the data transfer LSI 500 transfers the data from the cache memory 230 to the buffer memory 214, or "1" set when it transfers the data from the buffer memory 214 to the cache memory 230.

The flag column 606 has entries of information set for various items. The microprocessor 211 can set in the flag column 606 the values, for example, indicating whether the data error detection is made by using the values of the CRC column or whether the writing of data to the disk control unit 240 is made synchronously or asynchronously.

The identification information column 607 has entries of identification information (processing identification information) that the microprocessor 211 provides for each transfer information list. Thus, the data transfer LSI 500 can continuously read out a sequence of data transfer information belonging to the same transfer information list from the local memory 212.

The chain flag column 608 has entries of flag values indicating whether the data transfer information 600 that continues just after a sequence of data transfer information 600 belonging to the transfer information list should be processed or not. The data transfer LSI 500 can decide whether or not the data transfer information read out from the memory belongs to the related data transfer information group to be processed by using the values set in the identification information column 607 or chain flag column 608. In addition, the data transfer LSI 500 can read out other data transfer information 600 than that belonging to the data transfer group of this data transfer information 600, and make data transfer processing according to that data transfer information.

The RCRC column 609 has entries of error detecting code for the data to be transferred. The error detecting code set in the RCRC column 609 is computed by, for example, CRC. The RCRC column 609 provides the error detecting code for the data to be transferred when, for example, this storage device control apparatus 200 does not transfer data between the information processing apparatus 100 and the storage device 300 but transfers data for the copy (remote copy) to other storage device. Although the RCRC column 609 has entries of the error detecting code set for the data to be transferred, as does the above CRC column 604, the error detecting code set in the RCRC column 609 is copied into the end status information that will be described later, and written in the local memory 212. Thus, the microprocessor 211 can acquire the error detecting code for the data after the completion of the data transfer. The microprocessor 211 can use, for example, the error detecting code for the data transferred in the past data transfer processing, which is acquired from the end status information, as the initial values for the computation of the error detecting code for the data to be transferred. The microprocessor 211 can compute the error detecting code for the whole data to be transferred over a plurality of pieces of data transfer information 600.

The buffer address column 610 has entries of addresses on the buffer memory 214 that are used as the transfer sources or transfer destinations when the data transfer LSI 500 transfers data.

The LRC column 611 has entries of error detecting code for the data transfer information 600. This error detecting code is, for example, an LRC code computed by LRC. The microprocessor 211 computes the LRC code by using the values of the mask column 601, transfer byte number column 602, cache address column 603, CRC column 604, transfer direction column 605, flag column 606, identification information column 607, chain flag column 608, RCRC column 609 and buffer address column 610 together with the basic address as the initial value at which the data transfer information 600 is written on the local memory 212.

The data transfer LSI 500 can check to see if the read data transfer information is correct information by using the error detecting code incidental to the data transfer information. Thus, the data transfer processing can be made with higher reliability.

In addition, the microprocessor 211 generates not only the error detecting code for the data transfer information but also the reference position to be computed together for determining the position at which the data transfer LSI 500 starts to read out the data transfer information from the local memory 212. Therefore, the data transfer LSI 500 can detect error even if the data transfer information contains error or even if the data transfer LSI 500 reads out the data transfer information from an erroneous position of the memory.

In this embodiment, the error detecting codes set in the CRC column 604, RCRC column 609 and LRC column 611 of the data transfer information 600 are not limited to CRC code and LRC code, but other different codes such as check sum and hamming code can be used. Moreover, the error detecting codes set in the CRC column 604, RCRC column 609 and LRC column 611 of the data transfer information 600 may be computed by the data transfer LSI 500.

Also in this embodiment, although the identification information set in the identification information column 607 is provided for each transfer information list, it may be provided for each piece of data transfer information 600 as a unit. The data transfer LSI 500 makes data transfer processing on the basis of data transfer information 600, and causes the local memory 212 to store the resulting end status information that will be described later, in association with the identification information provided for each transfer information list. Thus, the microprocessor 211 can acquire the result of the data transfer processing in units that are each provided with the identification information.

(End Status Information)

FIG. 9 is a table showing one example of the end status information that the data transfer LSI 500 writes in the local memory 212 when the data transfer LSI 500 finishes the data transfer processing. In this embodiment, the data transfer LSI 500 generates the end status information for each transfer information list and writes it in the local memory 212.

The end status information 700 includes an identification information column 701, an end status code column 702, a transfer process number 703 and an RCRC column 704.

The identification information column 701 has entries of the same identification information as that set in the identification information column 607 of data transfer information 600 read out by the data transfer LSI 500. Thus, the data transfer LSI 500 makes the end status information 700 correspond to the transfer information list.

The end status code column 702 has entries of values indicating how the data transfer LSI 500 has finished the data transfer processing. In this embodiment, when the first bit of each value of the end status code column 702 is "1", it indicates that the data transfer LSI 500 has normally finished the data transfer processing for the corresponding transfer information list. If the second bit is "1", it indicates that the data transfer LSI 500 has forcibly ended the data transfer processing according to the forced termination command from the microprocessor 211. If the third bit is "1", it indicates that the data transfer LSI 500 has aborted the data transfer processing according to the abort command from the microprocessor 211. If the fourth bit is "1", it indicates that the data transfer LSI 500 has stopped the data transfer processing due to the error in hardware.

According to the invention, the data transfer information 600 and the end status information 700 are made corresponding to each other by the identification information that the microprocessor 211 provides to the data transfer information 600. Therefore, even if multiple pieces of end status information 700 coexist in the local memory 212, the microprocessor 211 can specify which end status corresponds to that for which data transfer information 600. In addition, the microprocessor 211 can decide if the data transfer LSI 500 has properly processed the data transfer information 600 and sent the end status information 700 back to the local memory 212. If the data transfer LSI 500 writes the end status information 700 in the local memory 212 at a known address, the microprocessor 211 can confirm that the end status information 700 written in the local memory 212 by the data transfer LSI 500 corresponds to the data transfer information 600 specified by the microprocessor 211. Therefore, the microprocessor 211 examines if the data transfer LSI 500 has read out the data transfer information 600 expected by the microprocessor 211 and if the data transfer LSI 500 has written the end status information 700 at the known address on the local memory 212.

The transfer process number column 703 has entries of the number of pieces of data transfer information 600 that the data transfer LSI 500 has processed of the data transfer information 600 belonging to the transfer information list. The microprocessor 211 specifies, by using the chain flag column 608 of data transfer information 600, the number of pieces of data transfer information 600 to be processed of the transfer information list by the data transfer LSI 500, and the data transfer LSI 500 sets the number of actually performed transfer processes in the transfer process number column 703 of end status information 700. The microprocessor 211 can compare the specified number of data transfer processes with the number of the processes performed by the data transfer LSI 500 to decide if the data transfer LSI 500 has correctly operated.

The RCRC column 704 has entries of the same values as set in the RCRC column 509 of data transfer information 600. The data transfer LSI 500 can also compute the error detecting code for the data to be transferred on the basis of the value set in the RCRC column 509 of data transfer information 600, and set the result in the RCRC column 704.

According to the invention, since the data transfer information is indirectly sent from the microprocessor 211 to the data transfer LSI 500 through the memory, and since the data transfer LSI 500 thus writes the end status information 700 in the memory, the microprocessor 211 can examine if the data transfer LSI 500 has transferred data by checking the written end status after the transfer processing.

The data transfer LSI 500 writes the identification information of the data transfer information 600 read out from the local memory 212 in the identification information column 701 of the end status information 700 for the data transfer processing. Therefore, even if multiple pieces of end status information 700 coexist in the local memory 212, the microprocessor 211 can specify which end status information 700 corresponds to which data transfer information 600.

The data transfer LSI 500, when completing the data transfer processing, writes the result as end status information 700 sequentially in a memory area of the local memory 212 that begins from a predetermined address. In this embodiment, in the initial setting mode or the like, the microprocessor 211 previously sets the predetermined address of local memory 212 in a register of the data transfer LSI 500. Setting of each register of data transfer LSI 500 will be described below.

(Arrangement of Registers)

Figure 10:
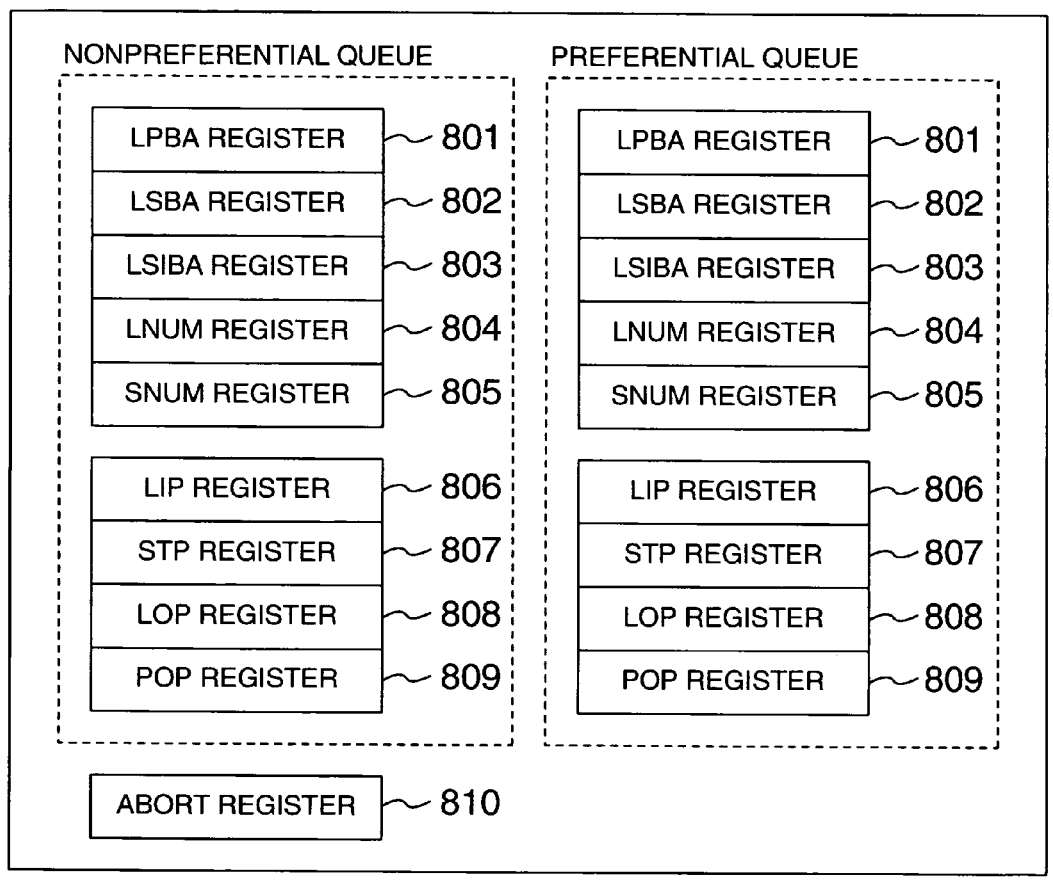
FIG. 10 is a table showing the registers that the data transfer LSI 500 has according to the second embodiment of the invention.

FIG. 10 is a diagram showing the registers provided in the data transfer LSI 500. The data transfer LSI 500 has LPBA registers 801, LSBA registers 802, LSIBA registers 803, LNUM registers 804, SNUM registers 805, LIP registers 806, STP registers 807, LOP registers 808, POP registers 809 and an ABORT register 810.

The LPBA register 801 has a reference address fixed for to the addresses at which the microprocessor 211 writes data transfer information 600 in the local memory 212 (this address is hereinafter called the list base address). The microprocessor 211 writes the data transfer information 600 in the local memory sequentially over an area beginning from the list base address set in the LPBA register 801.

The LSB register 802 has a reference address set for the addresses at which the data transfer LSI 500 writes the end status information 700 in the local memory 212 (this address will hereinafter be called the status base address). The data transfer LSI 500 writes the end status information 700 sequentially in the local memory over an area beginning from the status base address.

The LSIBA register 803 has an address (hereinafter called the status pointer address) fixed corresponding to the address on the local memory 212 at which a pointer (hereinafter, called status pointer) is written to indicate at what number address the data transfer LSI 500 has written the end status information 700 when counting from the status base address.

The LNUM register 804 has stored therein the number of pieces of data transfer information 600 that can be assigned to one transfer information list.

The SNUM register 805 has stored therein the number of pieces of the end status information 700 that the data transfer LSI 500 can write on the local memory 212.

The LIP register 806 has set therein by the microprocessor 211 the information (hereinafter, called the list write pointer) that indicates what number piece of information of transfer information list the microprocessor 211 has written in the local memory 212 when counting from the list base address. The microprocessor 211 updates the LIP register 806 each time it writes the data transfer information 600 belonging to the transfer information list in the local memory 212.

The STP register 807 has the status pointer set therein. The data transfer LSI 500 updates the STP register each time it writes the end status information 700 in the local memory 212. In addition, the data transfer LSI 500 writes the value set in the STP register 807 at the status pointer address on the local memory 212.

The LOP register 808 has set therein by the data transfer LSI 500 a pointer (hereinafter, called the list read pointer) that indicates what number piece of information 600 of a transfer information list the data transfer LSI 500 has read when counting from the list base address.

The POP register 809 has set therein the number of pieces of actually processed information 600 of a transfer information list belonging to the data transfer information 600 that the data transfer LSI 500 has read from the local memory 212. The microprocessor 212 compares the data transfer process number written in the chain flag column 608 of the data transfer information 600 with that actually processed by the data transfer LSI 500 to check if the data transfer processing has been correctly carried out.

The ABORT register 810 is used to stop the data transfer processing that the data transfer LSI 500 is making. The ABORT register 810 has set therein a value (hereinafter, called SUS ABORT) indicating to stop when the data transfer LSI 500 has completed the data transfer processing for each transfer information list. The SUS ABORT is a value of, for example, "0x0004". Also, it is possible that the ABORT register 810 has set therein a value (hereinafter, called MP ABORT) indicating to immediately terminate the data transfer processing that the data transfer LSI 500 is performing. The MP ABORT is a value of, for example, "0x0001". The operation that the data transfer LSI 500 makes for stopping the data transfer processing will be described later in detail.

The data transfer LSI 500 compares the list write pointer set in the LIP register 806 with the list read pointer set in the LOP register 808, thereby making it possible to detect that an instruction to make new data transfer process has been given by the microprocessor 211.

The data transfer LSI 500 can examine if there is any succeeding piece of information of a transfer information list to be processed by comparing the content of LIP register 806 with that of LOP register 808.

Thus, the microprocessor 211 can write each transfer information list in the sequential addresses beginning from the list base address, while the data transfer LSI 500 can read out each transfer information list from the sequential addresses beginning from the list base address. In other words, the queue for registering a transfer information list can be created on the local memory 212.

The microprocessor 211 registers data transfer information in two queues of the preferential queue for registering the data transfer information for the high-priority data transfer processing and the nonpreferential queue for registering the data transfer information for the usual data transfer processing. Therefore, as shown in FIG. 10, the data transfer LSI 500 has register pairs except the ABORT register 810, thus creating two queues on the local memory 212.

Each of the above registers may be owned by the data transfer fetch circuit 506 or DMA 501. In addition, the information stored in these registers may be stored in the local memory 212 or shared memory 220 in place of the registers so that the data transfer LSI 500 can refer to the local memory 212 or shared memory 220.

(Data Transfer Processing Using a Transfer Information List)

First, a description will be made of the case where only one queue in which a transfer information list is registered is used for the data transfer processing that uses the transfer information list according to this embodiment. FIG. 11 is a flowchart showing the flow of processes by which the data transfer processing is performed by using a transfer information list.

The microprocessor 211 causes the local memory 212 to store a predetermined number of pieces of data transfer information 600 set in the LNUM register 804 of data transfer LSI 500 as a transfer information list (S11001), and sets the list pointer in the LIP register 806 of data transfer LSI 500 (S11002).

On the other hand, the data transfer LSI 500 waits for a new list pointer to be set in the LIP register 806 while it is comparing the LIP register 806 and the LOP register 808 (S11003). When detecting that the microprocessor 212 has set a list pointer in the LIP register 806 (S11003: NO), the data transfer LSI 500 reads out the data transfer information from the local memory 212 (S11004). Within the data transfer LSI 500, the data transfer information fetch circuit 506 reads out the data transfer information 600 from the local memory 212, and sets a necessary value for data transfer processing in the register of DMA 501 (S11005). The data transfer LSI 500 makes processing for the data transfer between the cache memory 230 and the buffer memory 214 on the basis of the read data transfer information 600 (S11006). When finishing the data transfer processing, the data transfer LSI 500 checks to see if the value set in the chain flag column 608 of that data transfer information 600 is "1" (S11007). If it is "1" (S11007: YES), the processing goes back to step (S11004). However, the data transfer information 600 read out this time in this step (S11004) is the data transfer information 600 read out from the address that is located the data length of data transfer information 600 ahead of the address from which the data transfer LSI 500 previously read out the information 600. Thus, the data transfer LSI 500 sequentially reads out the data transfer information 600 on the basis of the chain flag 608 of the read data transfer information 600. The data transfer LSI 500 may read out all the pieces of data transfer information 600 belonging to the same transfer information list at a time. In this case, the data transfer LSI 500 decides that the data transfer information 600 having the same value set in the identification information column 607 belongs to the same transfer information list.

If the value set in the chain flag column 608 of the data transfer information 600 is not "1" (S11007: NO), the data transfer LSI 500 writes the result of the data transfer processing in the local memory 212 as the end status information 700 (S11008), and causes the status pointer set in the STP register 807 to increment (S11009). The data transfer LSI 500 writes the status pointer set in the STP register 807 at the status pointer address on the local memory 212, and makes the list pointer set in the LOP register 808 to increment, thus updating the LOP register 808 (S11010).

When the status pointer is updated by the data transfer LSI 500, the microprocessor 211 detects the update (S11011: YES), reads out the end status information 700 from the local memory 212 and makes the end process according to the end status information 700 as, for example, it transmits error information to the information processing apparatus 100 or causes the display unit to display error (S11012).

Thus, when the microprocessor 211 writes a plurality of pieces of data transfer information 600 as one transfer information list in the local memory 212, the data transfer LSI 500 can sequentially read out each of the plurality of data transfer information from the memory. In addition, the data transfer LSI 500 can decide if the data transfer information 600 read from the memory belongs to a data transfer information group that is processed in association by using the identification information of data transfer information 600. Also, the data transfer LSI 500 can read out other data transfer information 600 belonging to the data transfer information group mentioned above by using the identification information column 607 or chain flag column 608 of data transfer information 600 read from the local memory 212, and make the data transfer processing for that information.

For example, in the disk array unit, the data to be written accompanying the data write request from other host apparatus is transferred to the cache memory. In this case, necessary successive addresses sometimes cannot be secured for all the data to be written on the cache memory. Thus, according to the invention, when the data transfer processing for a plurality of pieces of information is desired to make continuously on a memory area of the data transfer source or transfer destination in which case the memory area is discontinuous, the first processor sets the same processing identification information in multiple pieces of data transfer information that specify the discontinuous memory area, and causes the group of these pieces of data transfer information to be registered in the queue. The second processor performs the data transfer processing for the group of pieces of data transfer information with the same processing identification information attached, thereby continuously making the data transfer processing for the group of information.

The data transfer LSI 500 may cause the local memory 212 to periodically write the status pointer set in the STP register 807. In addition, the data transfer LSI 500 may cause the local memory 212 to directly store the status pointer without using the STP register.

The case of having two queues will be described.

In this embodiment, two queues of preferential queue and nonpreferential queue are created on the local memory 212. The microprocessor 211 registers a transfer information list for high-priority data transfer processing in the preferential queue, and another list for the normal data transfer processing in the nonpreferential queue.

In this embodiment, the microprocessor 211 divides the task into two kinds of task: the task of I/O process according to the data input/output request from the information processing apparatus 100, and the task of internal processes such as local copy process, journal generation process, journal acquisition process, restore process or snapshot process. The microprocessor 211 causes the local memory 212 to store the number of registered pieces of data transfer information associated with each kind of task in the nonpreferential queue as a table (registered-number storing area). The microprocessor 211 acquires the number of registered pieces of the data transfer information for the data transfer processing caused by the task of the kind different from the running task. If this number of registered information exceeds a predetermined number, the microprocessor 211 decides that the priority of this data transfer processing is high. The microprocessor 211, when deciding that the priority of the data transfer processing is high, causes the data transfer information 600 for the data transfer processing to be registered in the preferential queue. When deciding that the priority is not high, the microprocessor 211 registers the data transfer information 600 in the nonpreferential queue.

In addition, the microprocessor 211 determines either one of the queues in order for the data transfer information 600 to be registered in accordance with the number of registered pieces of data transfer information 600 that is associated with a task other than the running task and registered in the nonpreferential queue. Thus, the microprocessor 211 can control the data transfer LSI 500 to make the data transfer processing with good balance for each of a plurality of tasks to be executed.

The microprocessor 211 can also determine if the priority of data transfer processing is high according to the priority level of the running task. In this case, the microprocessor 211 controls the local memory 212, for example, to store the identification information and priority level of the task to be executed. The microprocessor 211 can also control, for example, the priority of task to be stored as the priority of data transfer processing. The microprocessor 211 determines according to this priority if the data transfer information 600 is registered either in the preferential queue or in the nonpreferential queue.

Moreover, the microprocessor 211 may set up a priority at each task to be executed and determine one of the queues in which the data transfer information 600 is to be registered in accordance with this priority. Thus, the microprocessor 211 can control the high-priority data transfer processing to be made ahead of the low-priority data transfer processing.

The flow of the transfer processing for data transfer information 600 registered in the two queues as described above is the same as that shown in FIG. 11. However, there is the following difference.

The data transfer LSI 500 first makes the comparison between the LIP register 806 and the LOP register 808 for the preferential queue in the step (S11003) to decide if any transfer information list is registered in the preferential queue. If any transfer information list is not registered in the preferential queue (the value set in the LIP register 806 is equal to the value set in the LOP register 808), it makes the comparison between the LIP register 806 and the LOP register 808 for the nonpreferential queue. The data transfer LSI 500, when any transfer information list is registered in the preferential queue, does not make the data transfer processing for the transfer information list registered in the nonpreferential queue, but continuously makes the data transfer processing for the transfer information list registered in the preferential queue. Thus, the data transfer LSI 500 preferentially reads out the transfer information list from the preferential queue over that registered in the nonpreferential queue.

The microprocessor 21 can control the order of the data transfer processes by, for example, registering the data transfer information 600 for the high-priority data transfer processing at the head of the nonpreferential queue. However, if the data transfer LSI 500 read the data transfer information 600 from the nonpreferential queue during the time in which the microprocessor 211 was changing the order of pieces of data transfer information 600 registered in the nonpreferential queue, the data transfer processing could be performed in the order of data transfer processes scheduled by the microprocessor 211. Therefore, the microprocessor 211 would need to interrupt the operation of the data transfer LSI 500 in order that it could rearrange the pieces of data transfer information 600 to bring the high-priority information 600 to the head of the nonpreferential queue.

According to the invention, the data transfer LSI 500 reads out the data transfer information 600 from the preferential queue over that registered in the nonpreferential queue and makes the transfer processing for that information 600. Therefore, the microprocessor 211 can achieve the same effect as the registration of data transfer information 600 at the head of the nonpreferential queue by registering the data transfer information 600 for the high-priority data transfer in the preferential queue. Thus, the microprocessor 211 can preferentially make the data transfer processing for the data transfer information 600 registered in the preferential queue without interrupting the operation of the data transfer LSI 500. In other words, the microprocessor 211 can easily control to change the order of data transfer processes.

Also, the microprocessor 211 can preferentially make the data transfer processing for the data transfer information 600 registered in the preferential queue without changing the arrangement order of pieces of data transfer information 600 registered in the nonpreferential queue. Thus, when the data transfer information 600 is registered in accordance with the priority, the necessary access to the memory can be suppressed, and hence the data transfer processing can be efficiently performed.

(Aborting Data Transfer Processing for Each Transfer Information List)

A description will be made of the processing for the data transfer LSI 500 to abort the above data transfer processing.

As described above, the data transfer LSI 500 continuously makes data transfer processing for a plurality of pieces of data transfer information 600 set in the transfer information list during the time in which "1" is written in the chain flag column 608. In this case, when the microprocessor 211 writes SUSABORT in the ABORT register 810 of data transfer LSI 500, the data transfer LSI 500, after finishing a sequence of data transfer processes for a plurality of pieces of data transfer information set in the above transfer information list, aborts the data transfer processing for the succeeding transfer information list written in the local memory 212. When the microprocessor 211 writes MPABORT in the ABORT register 810 of data transfer LSI 500, the data transfer LSI 500 stops the above data transfer processing even when the processing is being executed. In other words, the microprocessor 211 writes the MPABORT in the ABORT register 810, thereby making it possible to forcibly stop the processing that the data transfer LSI 500 is carrying out. Thus, if the data transfer LSI 500 leaves the end status information 700 not to be written in the local memory 212 for a constant period of time, the microprocessor 211 writes MPABORT in the ABORT register 810, thereby controlling the data transfer LSI 500 to forcibly stop its data transfer operation.

The flow of the process for the data transfer LSI 500 to stop the data transfer processing is the same as that for the DMA controller 60 according to the first embodiment to stop the data transfer processing. The data transfer LSI 500 makes the data transfer processing in place of the DMA controller 60. The above ABORT register 810 is used as the register in which the abort command and forced termination command are set in place of the abort register 62.

The succeeding data transfer processing in the step (S4006) is made for a plurality of pieces of data transfer information 600 set in the transfer information list. In addition, the nonpreferential transfer information queue 21 and preferential transfer information queue 22 can be created on the local memory 212 as the continuous memory areas that begin from the nonpreferential list base address and preferential list base address, respectively. The end status queue 23 can be created on the local memory 212 as the continuous memory area that begins from the nonpreferential status base address or preferential status base address.

In addition, the data transfer LSI 500 generates the above end status information 700 as the result of having finished the data transfer processing, and writes it in the local memory 212. At this time, the data transfer LSI 500 reads out the identification information set in the identification information column 607 of data transfer information 600 from the local memory 212 and sets it in the identification information column 701. The data transfer LSI 500, when the SUSABORT or MPABORT is set in the ABORT register 810, also sets "1" in the corresponding bit of the end status code column 702.

Thus, according to the invention, the second processor (data transfer LSI 500) makes the data transfer processing for a group of data transfer information (data transfer information group of which the information pieces are coupled by the chain flag column 608) with the same processing identification information attached. After the transfer processing for all the group of data transfer information is finished, if the abort command is set in the register, the succeeding data transfer processing is stopped. Therefore, the second processor can stop the data transfer processing at the time when the sequence of data transfer processes based on the data transfer information group has been completed. Thus, the second processor never stops the data transfer processing during the time in which the processing for the plurality of successive data transfer processes is being executed. Therefore, the reduction of the data transfer ability of the whole data transfer apparatus due to the stop of operation can be suppressed to the minimum since the second processor never stops the data transfer processing.

Moreover, when the abort command is set in the ABORT register 810, the data transfer LSI 500 sets in the end status code column 702 of end status information 700 the abort flag that indicates if the data transfer processing has been stopped. Therefore, the microprocessor 211 is able to know that the data transfer LSI 500 has stopped the data transfer processing in accordance with the abort command set in the ABORT register 810 of data transfer LSI 500 by referring to the end status code column 702 of end status information 700 stored in the local memory 212. Accordingly, the microprocessor 211 can see indirectly through the local memory 212 that the data transfer LSI 500 has stopped the data transfer processing without monitoring the operation of the data transfer LSI 500 and without directly receiving the notice of having stopped the data transfer processing from the data transfer LSI 500. Thus, the microprocessor 211 can efficiently operate.

OTHER EMBODIMENTS

While the microprocessor 211 writes each transfer information list in the local memory 212 in the above embodiment, each piece of data transfer information can be written. For example, information of what number piece of the multiple pieces of data transfer information 600 is stored in the local memory 212 is set in the LIP register 804 or PRLIP register 814 of the data transfer LSI 500 so that, when the microprocessor 211 writes the multiple pieces of data transfer information 600, the information of the number can indicate that the last one of the multiple pieces of data transfer information 600 has been written. Then, the data transfer LSI 500 adds the data length of data transfer information 600 to the nonpreferential list base address or preferential list base address repetitively the number of times corresponding to the number of pieces of information set in the LOP register 808 or PRLOP register 818, and thereby finds the addresses at which the data transfer information 600 is read from the local memory 212 so that the information 600 can be read from the memory. The data transfer LSI 500, when the chain flag column 608 of the read data transfer information 600 is "1", also adds the data length of data transfer information 600 to the read address again and again to continue the reading of data transfer information 600. Therefore, the information about data transfer is transmitted not in a unit of a transfer information lists but in a unit of a piece of transfer information 600 from the microprocessor 211 to the data transfer LSI 500, so that the variable-length data transfer information 600 can be transmitted and received.

Also, while the data transfer information 600 is written in the local memory 212 that the microprocessor 211 manages in the above embodiment, a memory device such as the shared memory 220, cache memory 230 or other memory to which the microprocessor and data transfer LSI can similarly access may be used in place of the local memory 212.

In addition, the present invention can be applied to the disk control unit 240. If the disk control unit 240 has a microprocessor, a local memory, an interface for access to the storage device 300, and a data transfer LSI, the data transfer processing for the data to be transferred between the cache memory 230 and the storage device 300 can be made in the same way as in the channel control unit 210.

Furthermore, the invention can be applied to the storage device control apparatus having the communications interfaces 213 (communications interface unit), microprocessors 211, local memories 212, data transfer LSI 500, and interfaces (storage device interfaces) to the storage device 300 integrally arranged within the channel control unit 210. In this case, the data transfer LSI 500 can make the data transfer processing between the storage device 300 and the buffer memory 214 in place of the cache memory 230.

The above embodiments have been described in order to easily understand the invention, and thus the present invention is not limited to those embodiments. The present invention can be changed and modified without departing from the scope of the invention. In addition, the invention also includes the equivalents of the changes and modifications.

The invention claimed is:

1. A data transfer apparatus comprising:
   a memory having first and second queues for registering data transfer information that includes information for specifying a first memory area and information for specifying a second memory area, said first queue having a higher transfer priority than said second queue;
   a first processor operable to register said data transfer information in one of said first queue and said second queue; and
   a second processor operable to perform data transfer processing to transfer data stored in said first memory area to said second memory area,
   wherein said second processor is operable to read out said data transfer information registered in said first queue, execute said data transfer processing on the basis of said read data transfer information, and determine whether subsequent data transfer information that follows said read data transfer information is registered in said first queue,
   wherein said second processor, if the subsequent data transfer information is registered in said first queue, is operable to read out said subsequent data transfer information from said first queue, and perform the data transfer processing on the basis of said read data transfer information,
   wherein said second processor, if said subsequent data transfer information is not registered in said first queue, is operable to read out said subsequent data transfer information from said second queue, and perform said data transfer processing on the basis of said read subsequent data transfer information,
   wherein the data transfer apparatus is operable to process data for at least two types of task, a number of registered pieces of data transfer information for each type of task being stored in the second queue having a lower transfer priority than the first queue, and
   wherein when a first type of the types of task is currently running on the data transfer apparatus, the data transfer apparatus is operable to determine when the number of registered pieces of data transfer information for a second type not currently running on the data transfer apparatus exceeds a predetermined number, whereby the data transfer apparatus determines a priority of the second type to be high and causes data transfer information for the second type to be registered in the first queue with the higher transfer priority, thereby striking a balance between processing of the first and second types.

2. A data transfer apparatus according to claim 1, further comprising a priority manager which manages task identification information as identification information of a task to be executed by said first processor, and a priority of said data transfer processing caused by said task to correlate with each other, wherein
   said first processor acquires said priority corresponding to said task identification information of said task that is being executed from said priority manager, determines either said first queue or said second queue in which said data transfer information for said data transfer processing caused by said task is registered according to said acquired priority, and causes said data transfer information to be registered in said determined queue.

3. A data transfer apparatus according to claim 1, further comprising a registration number memory in which the number of pieces of said data transfer information registered in said second queue, and given for said data transfer processing caused by said task of the same kind as that executed by said first processor is stored for each piece of said task identification information of said task, wherein
   said first processor acquires from said registration number memory said registration number for said task other than said task corresponding to said data transfer information that is tried to register in said first or second queue, determines either one of said queues in which said data transfer information is to register in accordance with said acquired registration number, and causes said data transfer information to be registered in said determined queue.

4. In a data transfer apparatus comprising a memory having first and second queues for registering data transfer information including information for specifying a first memory area and information for specifying a second memory area, a first processor which registers said data transfer information in said first queue or said second queue, said first queue having a higher transfer priority than said second queues, and a second processor which performs a control method of data transfer processing to transfer data stored in said first memory area to said second memory area, the data transfer apparatus being operable to process data for at least two types of task, said control method comprising:
   reading out said data transfer information registered in said first queue, making said data transfer processing on the basis of said read data transfer information, and deciding if subsequent data transfer information that follows said read data transfer information is registered in said first queue, if said subsequent data transfer information is registered in said first queue, reading out said subsequent data transfer information from said first queue, and making said data transfer processing on the basis of said read data transfer information, if said subsequent data transfer information is not registered in said first queue, reading out said subsequent data transfer information from said second queue, and making said data transfer processing on the basis of said read subsequent data transfer information, storing a number of registered pieces of data transfer information for each type of task in the second queue having a lower transfer priority than the first queue, and when a first type of the types of task is currently running on the data transfer apparatus, determining when the number of registered pieces of data transfer information for a second type not currently running on the data transfer apparatus exceeds a predetermined number, whereby the data transfer apparatus determines a priority of the second type to be high and causes data transfer information for the second type to be registered in the first queue with the higher transfer priority, thereby striking a balance between processing of the first and second types.

5. A storage device control apparatus comprising:

a communications interface unit having a buffer memory for receiving a data input/output request transmitted from an information processing apparatus to an storage device and storing said received data input/output request;

a storage device interface unit for transmitting and receiving data to and from said storage device;

a memory having first and second queues for storing data transfer information that includes information for specifying a memory area of said buffer memory and information for specifying a memory area of said storage device;

a first processor for causing said data transfer information to be registered in said first queue or said second queue, said first queue having a higher transfer priority than said second queue; and a second processor that makes data transfer processing to transfer data between said buffer memory and said storage device, said second processor having a plurality of registers, wherein said second processor reads out said data transfer information registered in said first queue, makes said data transfer processing on the basis of said read data transfer information, and decides if subsequent data transfer information that follows said read data transfer information is registered in said first queue, wherein said second processor, if said subsequent data transfer information is registered in said first queue, reads out said subsequent data transfer information from said first queue, and makes said data transfer processing on the basis of said read data transfer information, wherein said second processor, if said subsequent data transfer information is not registered in said first queue, reads out said data transfer information from said second queue, and makes said data transfer processing on the basis of said read data transfer information, wherein the storage device control apparatus is operable to process data for at least two types of task, a number of registered pieces of data transfer information for each type of task being stored in the second queue having a lower transfer priority than the first queue, and wherein when a first type of the types of task is currently running on the storage device control apparatus, the storage device control apparatus is operable to determine when the number of registered pieces of data transfer information for a second type not currently running on the data transfer apparatus exceeds a predetermined number, whereby the storage device control apparatus determines a priority of the second type to be high and causes data transfer information for the second type to be registered in the first queue with the higher transfer priority, thereby striking a balance between processing of the first and second types.

6. A storage device control apparatus comprising:

a channel control unit for receiving a data input/output request transmitted from an information processing apparatus to a storage device;

a disk control unit for controlling the input/output of data to said storage device; and a cache memory for storing data transmitted and received between said channel control unit and said disk control unit, said channel control unit comprising:

a communications interface unit having a buffer memory for receiving said data input/output request from said information processing apparatus and storing said received data input/output request;

a memory having first and second queues for storing data transfer information that includes information for specifying a memory area of said buffer memory and information for specifying a memory area of said cache memory;

a first processor for causing said data transfer information to be registered in said first queue or said second queue, said first queue having a higher transfer priority than said second queue; and a second processor for making data transfer processing to transfer data between said buffer memory and said cache memory, said second processor having a plurality of registers, wherein said second processor reads out said data transfer information registered in said first queue, makes said data transfer processing on the basis of said read data transfer information, and decides if subsequent data transfer information that follows said read data transfer information is registered in said first queue, said second processor, if said subsequent data transfer information is registered in said first queue, reads out said subsequent data transfer information from said first queue, and makes said data transfer processing on the basis of said read data transfer information, wherein said second processor, if said subsequent data transfer information is not registered in said first queue, reads out said data transfer information from said second queue, and makes said data transfer processing on the basis of said read data transfer information, wherein the storage device control apparatus is operable to process data for at least two types of task, a number of registered pieces of data transfer information for each type of task being stored in the second queue having a lower transfer priority than the first queue, and wherein when a first type of the types of task is currently running on the storage device control apparatus, the storage device control apparatus is operable to determine when the number of registered pieces of data transfer information for a second type not currently running on the data transfer apparatus exceeds a predetermined number, whereby the storage device control apparatus determines a priority of the second type to be high and causes data transfer information for the second type to be registered in the first queue with the higher transfer priority, thereby striking a balance between processing of the first and second types.

7. In a storage device control apparatus comprising a channel control unit for receiving a data input/output request transmitted from an information processing apparatus to a storage devices, a disk control unit for controlling the input/output of data to said storage device, and a cache memory for storing data transmitted and received between said channel control unit and said disk control unit, said channel control unit including a communications interface unit having a buffer memory for receiving said data input/output request from said information processing apparatus and storing said received data input/output request, a memory having first and second queues for storing data transfer information that includes information for specifying a memory area of said buffer memory and information for specifying a memory area of said cache memory, a first processor for causing said data transfer information to be registered in said first queue or said second queue, said first queue having a higher transfer priority than said second queue, and a second processor for making data transfer processing to transfer data between said buffer memory and said cache memory, said second processor having a plurality of registers, the storage device control apparatus being operable to process data for at least two types of task, a control method using said storage device control apparatus comprising:

reading out said data transfer information registered in said first queue, performing said data transfer processing on the basis of said read data transfer information, and deciding if subsequent data transfer information that follows said read data transfer information is registered in said first queue, if said subsequent data transfer information is registered in said first queue, reading out said subsequent data transfer information from said first queue, and performing said data transfer processing on the basis of said read data transfer information, if said subsequent data transfer information is not registered in said first queue, reading out said data transfer information from said second queue, and performing said data transfer processing on the basis of said read data transfer information, storing a number of registered pieces of data transfer information for each type of task in the second queue having a lower transfer priority than the first queue, and when a first type of the types of task is currently running on the data transfer apparatus, determining when the number of registered pieces of data transfer information for a second type not currently running on the data transfer apparatus exceeds a predetermined number, whereby the data transfer apparatus determines a priority of the second type to be high and causes data transfer information for the second type to be registered in the first queue with the higher transfer priority, thereby striking a balance between processing of the first and second types.

8. A data transfer apparatus according to claim 1, wherein the first type of task is an input/output (I/O) process for an I/O request.

9. A data transfer apparatus according to claim 1, wherein the second type of task is an internal process.

10. A control method according to claim 4, wherein the first type of task is an input/output (I/O) process for an I/O request.

11. A control method according to claim 4, wherein the second type of task is an internal process.

12. A storage device control apparatus according to claim 5, wherein the first type of task is an input/output (I/O) process for an I/O request.

13. A storage device control apparatus according to claim 5, wherein the second type of task is an internal process.

14. A storage device control apparatus according to claim 6, wherein the first type of task is an input/output (I/O) process for an I/O request.

15. A storage device control apparatus according to claim 6, wherein the second type of task is an internal process.

16. A control method according to claim 7, wherein the first type of task is an input/output (I/O) process for an I/O request.

17. A control method according to claim 7, wherein the second type of task is an internal process.

* * * * *